US010946319B2

(12) United States Patent
Subrahmanya et al.

(10) Patent No.: US 10,946,319 B2
(45) Date of Patent: Mar. 16, 2021

(54) FILTER ASSEMBLY FOR IMPROVED FILTER CARTRIDGE PLACEMENT AND DETECTION IN A REFRIGERATOR APPLIANCE

(71) Applicant: Haier US Appliance Solutions, Inc., Wilmington, DE (US)

(72) Inventors: Praveena Alangar Subrahmanya, Vittal (IN); Sharath Chandra Prasad, Hyderabad (IN); Gregory Sergeevich Chernov, Lousiville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 27 days.

(21) Appl. No.: 16/365,858

(22) Filed: Mar. 27, 2019

(65) Prior Publication Data
US 2020/0306671 A1    Oct. 1, 2020

(51) Int. Cl.
*B01D 35/143*    (2006.01)
*C02F 1/00*    (2006.01)
(Continued)

(52) U.S. Cl.
CPC ....... *B01D 35/143* (2013.01); *B01D 35/1573* (2013.01); *C02F 1/003* (2013.01); *F25D 23/126* (2013.01); *C02F 2209/40* (2013.01); *C02F 2307/10* (2013.01); *C02F 2307/12* (2013.01); *F25D 2700/00* (2013.01)

(58) Field of Classification Search
CPC . F25D 23/126; F25D 2700/00; B01D 35/143; C02F 1/003; C02F 2307/10; C02F 2307/12
See application file for complete search history.

(56) References Cited

U.S. PATENT DOCUMENTS

| 5,744,030 A | 4/1998 | Reid et al. |
| 6,537,444 B2 * | 3/2003 | Wilberscheid ......... B01D 29/21 |
| | | 210/85 |

(Continued)

FOREIGN PATENT DOCUMENTS

| CN | 202212062 U | 5/2012 |
| CN | 203790657 U | 8/2014 |

(Continued)

OTHER PUBLICATIONS

Xuanbing Qiu, et al., A Novel Identification System Based on Visible Light Communication, Research Gate, Conference Paper, May 2013, 1-5 pages.

(Continued)

*Primary Examiner* — Marc E Norman
(74) *Attorney, Agent, or Firm* — Dority & Manning, P.A.

(57) ABSTRACT

A filter assembly with features for improved filter cartridge placement and detection are provided. The filter assembly includes a filter cartridge and a filter housing for receiving the filter cartridge. A contact member extends from the filter housing for engaging the filter cartridge when the filter cartridge in the installed position. A first contact is mounted to the contact member and a second contact is mounted to the filter cartridge such that the first contact and the second contact establish an electrical connection when the filter cartridge in the installed position.

17 Claims, 14 Drawing Sheets

(51) Int. Cl.
  *F25D 23/12* (2006.01)
  *B01D 35/157* (2006.01)

(56) References Cited

U.S. PATENT DOCUMENTS

| | | |
|---|---|---|
| 6,632,355 B2 | 10/2003 | Fritze |
| 7,506,666 B2 | 3/2009 | Tubby et al. |
| 7,836,708 B2 | 11/2010 | Krause et al. |
| 8,177,973 B2 | 5/2012 | Kennedy et al. |
| 8,182,699 B2 | 5/2012 | Fritze |
| 8,673,137 B2 | 3/2014 | Verdegan et al. |
| 8,935,938 B2 | 1/2015 | Krause et al. |
| 9,011,686 B2 | 4/2015 | Kirchner et al. |
| 9,366,388 B2 | 6/2016 | Krause et al. |
| 9,370,737 B1 | 6/2016 | Nuss et al. |
| 9,393,507 B2 | 7/2016 | Nuss |
| 2002/0144938 A1* | 10/2002 | Hawkins ............... B01D 29/21 210/85 |
| 2006/0151364 A1 | 7/2006 | Hacker |
| 2011/0036109 A1* | 2/2011 | Krause ................ F25D 23/126 62/126 |
| 2011/0139698 A1 | 6/2011 | Freystedt et al. |
| 2015/0101990 A1* | 4/2015 | Venkatakrishnan .... C02F 1/008 210/742 |
| 2015/0143830 A1* | 5/2015 | Krause .................. C02F 1/003 62/126 |
| 2017/0050130 A1* | 2/2017 | Bippus ................ F25D 23/126 |

FOREIGN PATENT DOCUMENTS

| | | |
|---|---|---|
| JP | H11287729 A | 10/1999 |
| KR | 20000074968 A | 12/2000 |
| KR | 100668767 B1 | 1/2007 |
| WO | WO2015/167248 A1 | 11/2015 |

OTHER PUBLICATIONS

Paul Dietz, et al., Very Low-Cost Sensing and Communication Using Bidirectional LEDs, Mitsubishi Electric Research Laboratories, Massachusetts, Jul. 2003, 1-19 pages.

HL Minh, 100 Mb/s NRZ visible light communications using a Postequalized White LE, IEEE Photonics Technology Letters, vol. 21, No. 15, 2009, pp. 1063-1065.

J. Grubor, Wireless high-speed data transmission with phosphorescent white-light LEDs, Proc. Eur. Conf. Optical Communications, Berlin, Germany, Jun. 11, 2007, pp. 1-2.

* cited by examiner

FILTER ASSEMBLY FOR IMPROVED FILTER CARTRIDGE PLACEMENT AND DETECTION IN A REFRIGERATOR APPLIANCE

FIELD OF THE INVENTION

The present subject matter relates generally to refrigerator appliances, and more particularly to filter assemblies having features for improved placement and detection of filter cartridges.

BACKGROUND OF THE INVENTION

Refrigerator appliances generally include a cabinet that defines a chilled chamber for receipt of food articles for storage. In addition, refrigerator appliances commonly include dispensing assemblies for providing water and/or ice to the user, and water filter assemblies are frequently used to filter such water before use. For example, certain water filter assemblies include a manifold and a filter cartridge. The manifold directs unfiltered water into the filter cartridge and filtered water out of the filter cartridge. The filter cartridge includes a filter medium, such as an activated carbon block, a pleated polymer sheet, a spun cord material, or a melt blown material. The filter medium is positioned within the filter cartridge and filters water passing therethrough.

Over time, the filter medium will lose effectiveness. For example, pores of the filter medium can become clogged or the filter medium can become saturated with contaminants. To ensure that the filtering medium has not exceeded its filtering capacity, the filtering medium is preferably replaced or serviced at regular intervals regardless of its current performance. To permit replacement or servicing of the filter medium or the filter cartridge, the filter cartridge is generally removably mounted to the manifold. However, users frequently experience difficulty in positioning replacement cartridges such that they fully engage the manifold, resulting in potential leaks.

Accordingly, a refrigerator appliance with an improved filter assembly would be useful. More specifically, a filter assembly that includes features for simplifying installation and for detecting the presence of a filter cartridge would be particularly beneficial.

BRIEF DESCRIPTION OF THE INVENTION

Aspects and advantages of the invention will be set forth in part in the following description, or may be apparent from the description, or may be learned through practice of the invention.

In a first exemplary embodiment, a filter assembly is provided including a filter cartridge configured for filtering a flow of fluid and being movable between an installed position and an uninstalled position and a filter housing configured for receiving the filter cartridge in the installed position. A contact member extends from the filter housing for engaging the filter cartridge when the filter cartridge in the installed position, a first contact is mounted to the contact member, and a second contact is mounted to the filter cartridge such that the first contact and the second contact establish an electrical connection when the filter cartridge in the installed position.

According to another exemplary embodiment, a refrigerator appliance is provided including a cabinet that defines a chilled chamber for receipt of food articles for storage, a dispensing assembly for providing a flow of water, and a filter assembly mounted to the cabinet and operably coupled to the dispensing assembly. The filter assembly includes a filter cartridge for filtering the flow of water, a filter housing configured for receiving a filter cartridge, and a contact member extending from the filter housing for engaging the filter cartridge when the filter cartridge in an installed position. A first contact is mounted to the contact member, a second contact is mounted to the filter cartridge such that the first contact and the second contact establish an electrical connection when the filter cartridge in the installed position, and a controller is operably coupled to the first contact and is configured for determining that the filter cartridge is properly installed if the electrical connection is established.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
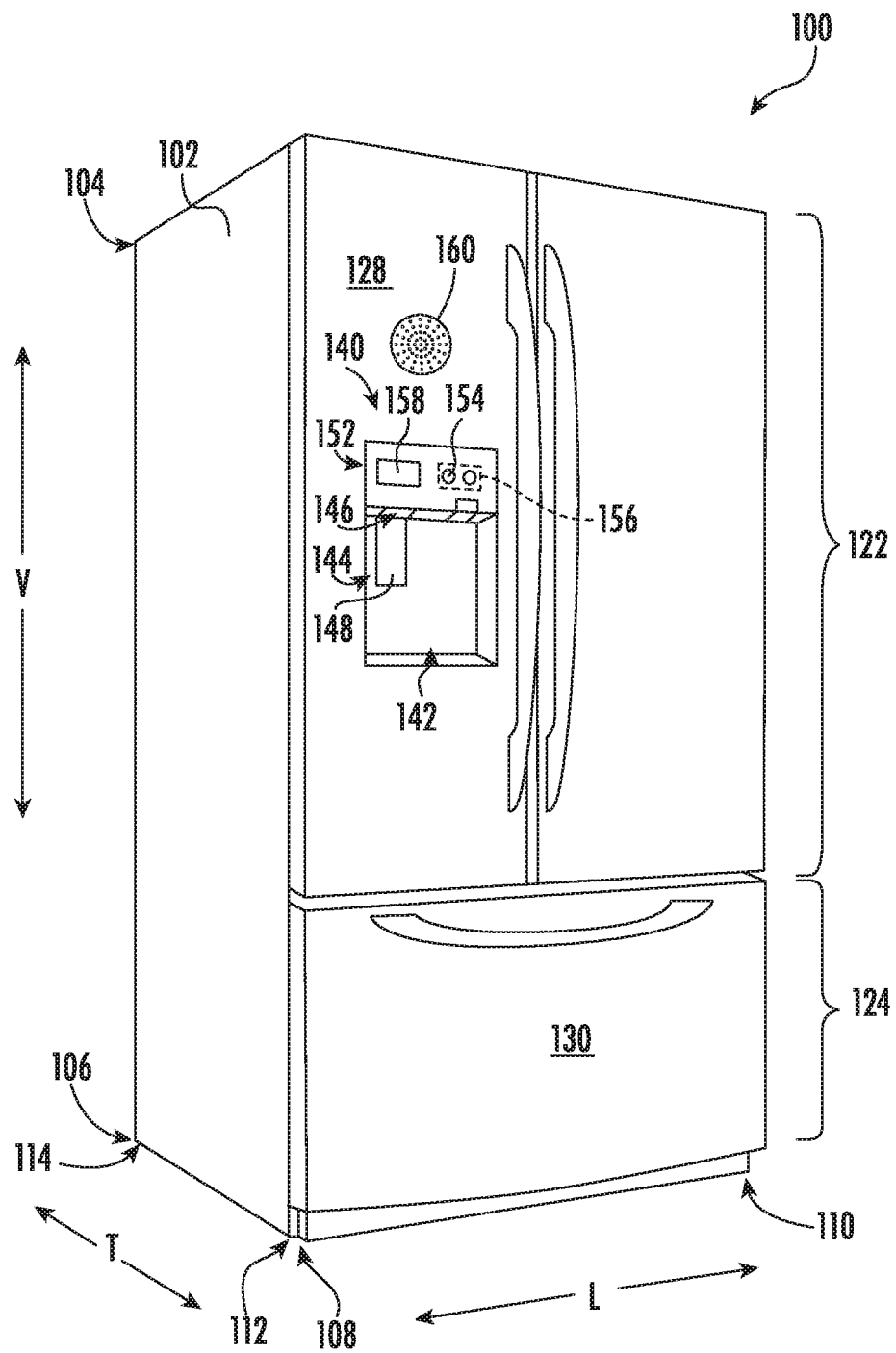
FIG. 1 provides a perspective view of a refrigerator appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another, such that an orthogonal coordinate system is generally defined.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other fluid supply systems or water-consuming appliances as well, such as ice makers, coffee makers, water coolers, etc. Consequently, the description set forth herein is for illustrative purposes only and is not intended to be limiting in any aspect to any particular appliance or configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1. One skilled in the art will appreciate that other chamber and door configurations are possible and within the scope of the present invention.

Figure 2:
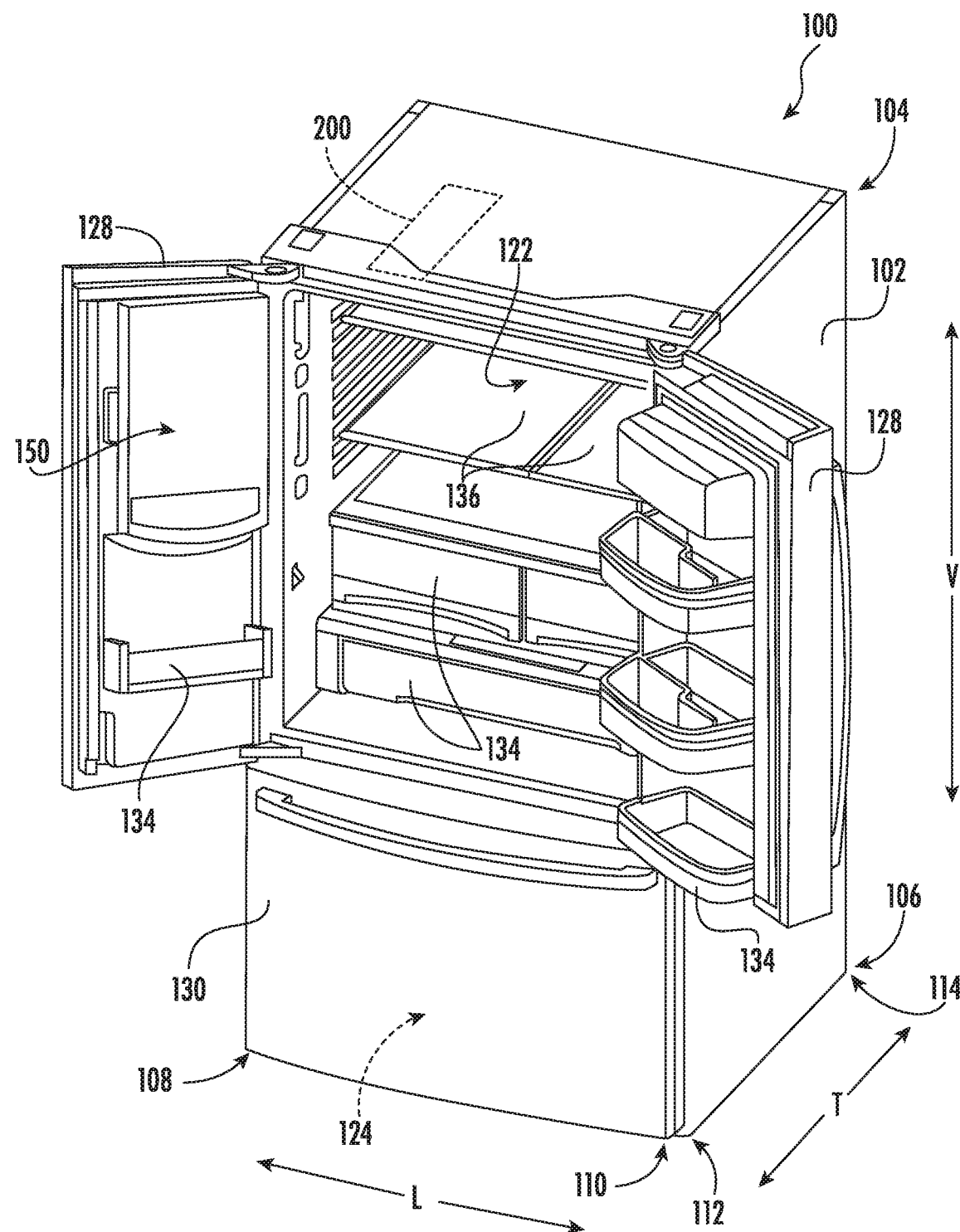
FIG. 2 provides a perspective view of the exemplary refrigerator appliance of FIG. 1, with the doors of the fresh food chamber shown in an open position.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, a dispensing assembly 140 will be described according to exemplary embodiments of the present subject matter. Although several different exemplary embodiments of dispensing assembly 140 will be illustrated and described, similar reference numerals may be used to refer to similar components and features. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touchscreen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154.

As used herein, "processing device" or "controller" may refer to one or more microprocessors or semiconductor devices and is not restricted necessarily to a single element. The processing device can be programmed to operate refrigerator appliance 100, dispensing assembly 140, and other components of refrigerator appliance 100. The processing device may include, or be associated with, one or more memory elements (e.g., non-transitory storage media). In some such embodiments, the memory elements include electrically erasable, programmable read only memory (EE-PROM). Generally, the memory elements can store information accessible processing device, including instructions that can be executed by processing device. Optionally, the instructions can be software or any set of instructions and/or data that when executed by the processing device, cause the processing device to perform operations.

As may be seen in FIG. 1, refrigerator appliance 100 also includes a display 158. According to the illustrated embodiment, display 158 may be provided on control panel 152 and may be any suitable device or mechanism for providing visual feedback to a user of refrigerator appliance 100. As an example, display 158 may be an indicator light such as a light emitting diode or bulb that flashes or otherwise emits light when a certain event occurs. As another example, display 158 may be a liquid crystal display, plasma screen, or a touchscreen display that displays messages or information thereon and provides for interactive user input. Display 158 may be in communication with controller 156, and may display information in response to signals from controller 156. For example, as will be described below, display 158 may provide a notification to a user of refrigerator appliance 100 that a water filter is malfunctioning or a leak is detected, that an authentic filter is or is not detected, that a filter cartridge is properly or improperly positioned, that a filter cartridge needs to be replaced, or that other service or performance issues related to the operation of refrigerator appliance 100 need to be addressed.

According to the illustrated embodiment, refrigerator appliance 100 further includes a sound generator 160. Sound generator 160 is configured for generating an audible indicator in response to a condition or event related to refrigerator appliance 100. Sound generator 160 can be any suitable mechanism for providing audible feedback to a user of refrigerator appliance 100, e.g., such as a speaker that emits sound, a beeper, etc. Similar to display 158, controller 156 is in communication with sound generator 160 and can selectively activate sound generator 160 in order to notify a user of refrigerator appliance 100 of operating conditions similar to those described above.

Display 158 and sound generator 160 may be positioned at any suitable locations on refrigerator appliance 100. For example, display 158 and sound generator 160 can be mounted to housing 102 of refrigerator appliance 100, e.g., at control panel 152 of refrigerator appliance 100 above dispenser recess 142. It should be understood that refrigerator appliance 100 need not include both display 158 and sound generator 160 and may include only display 158 or sound generator 160.

Figure 3:
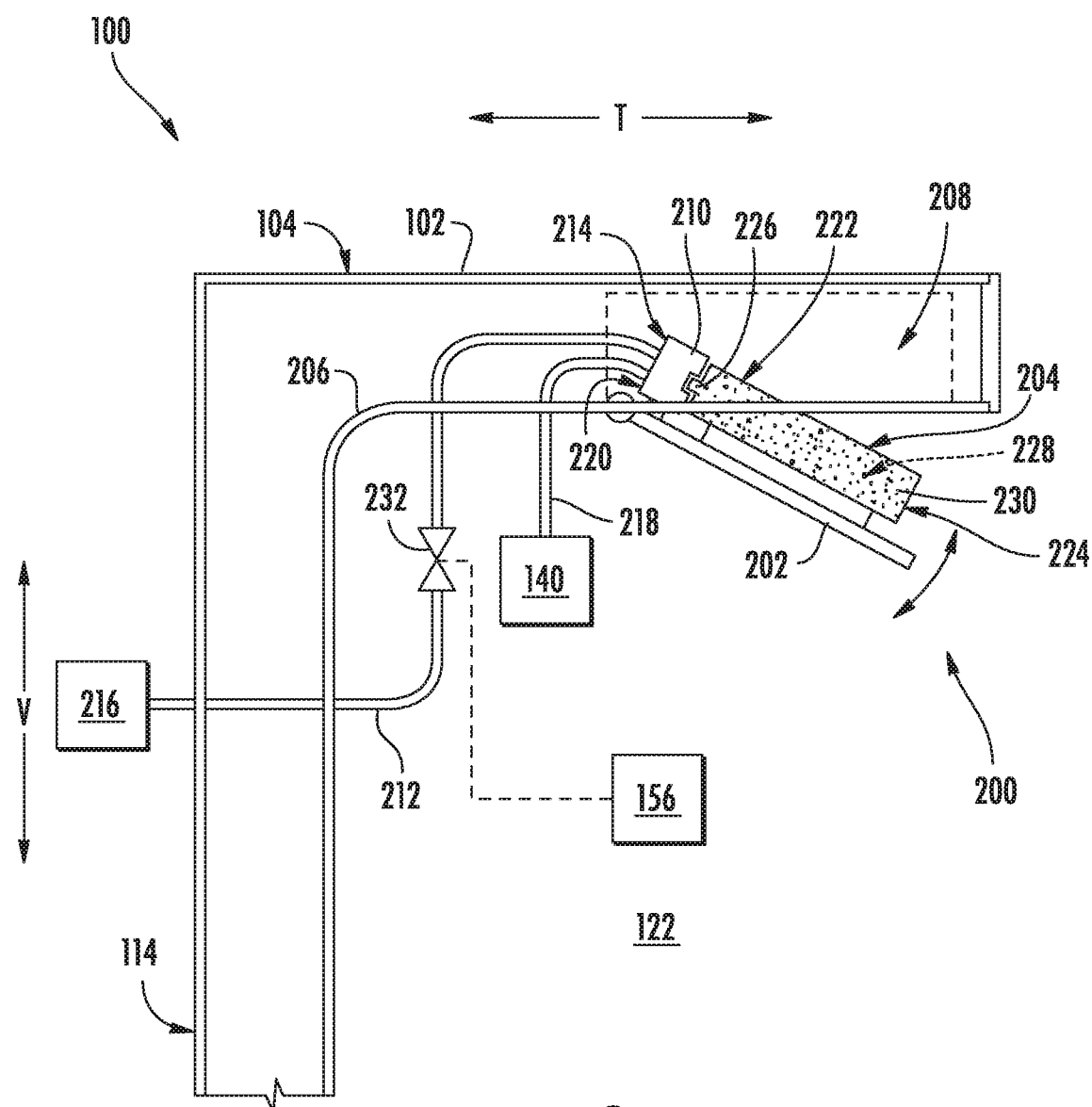
FIG. 3 provides a schematic side view of a filter assembly for use with the exemplary refrigerator appliance of FIG. 1 according to an exemplary embodiment of the present subject matter.
Figure 4:
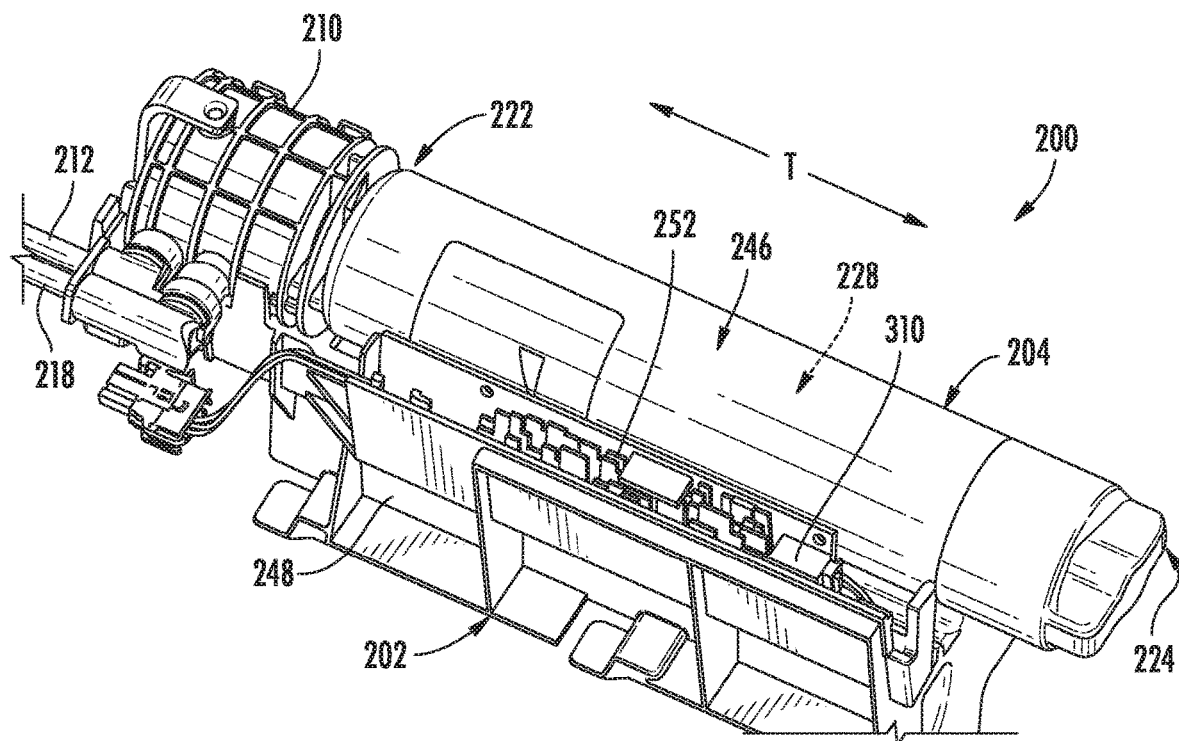
FIG. 4 provides a perspective view of the exemplary filter assembly of FIG. 3 according to an exemplary embodiment of the present subject matter.

Referring now generally to FIGS. 2 through 4, a filter assembly 200 which may be used with refrigerator appliance 100 will be described according to exemplary embodiments of the present subject matter. Specifically, FIG. 2 illustrates an exemplary location of filter assembly 200 within cabinet 102. FIG. 3 provides a side, schematic view of filter assembly 200. FIG. 4 provides a perspective view of an exemplary filter assembly 200. It should be appreciated that filter assembly 200 is illustrated and described herein as being positioned for use in refrigerator appliance 100. However, it should be appreciated that aspects of the present subject matter are not limited to the embodiments described or to the particular application disclosed.

As discussed in greater detail below, filter assembly 200 is generally configured for filtering water passing therethrough. In such a manner, filter assembly 200 can provide filtered water to various components of refrigerator appliance 100, such as dispensing assembly 140. Specifically, filter assembly 200 may generally include a filter housing 202 that is mounted within cabinet 102 and is generally configured for receiving a filter cartridge 204. For example, as illustrated in FIG. 3, filter housing 202 may be pivotally mounted to a top wall of an insulated liner 206 which defines fresh food chamber 122. In addition, refrigerator appliance 100 may define a void or filter recess 208 between insulated liner 206 and top 104 of cabinet 102 for receiving filter housing 202 and filter cartridge 204 when pivoted into the closed position. In this regard, filter housing 202 may be pivoted between an open position (e.g., as shown in FIG. 3) for permitting a user to access or install filter cartridge 204 and a closed position (not shown) when filter assembly 200 is in use.

According to the illustrated embodiment, filter assembly 200 is positioned proximate top 104 of cabinet 102, e.g., within filter recess 208 in the insulated space between insulated liner 206 and cabinet 102. However, it should be appreciated that filter housing 202 can be mounted to any suitable portion of refrigerator appliance 100 in order to receive filter cartridge 204 for filtering water within refrigerator appliance 100. For example, filter housing 202 may be mounted to refrigerator door 128, proximate bottom 106 of cabinet 102, or on an outside of cabinet 102. In addition, although filter housing 202 is illustrated as being pivotally mounted for installing or removing filter cartridges 204, it should be appreciated that access could alternatively be obtained through an access door or in any other suitable manner. According to exemplary embodiments, it is desirable that filter housing 202 have a known orientation relative to the vertical direction V. Thus, as used herein, directional references related to filter assembly 200 (when filter housing 202 is in the closed position) are intended to correspond to the vertical direction V, the lateral direction L, and the transverse direction T of refrigerator appliance 100.

As may be seen in FIGS. 3 and 4, filter assembly 200 includes a filter manifold 210 which is mounted to filter housing 202, e.g., at or proximate a rear of filter housing 202 along the transverse direction T. Filter manifold 210 is configured for receiving unfiltered water and directing filtered water out of filter assembly 200. In particular, filter manifold 210 includes an inlet conduit 212 that defines an inlet 214 for receiving unfiltered water, e.g., from a water source 216 such as a municipal water supply or a well. Filter manifold 210 also includes an outlet conduit 218 that defines an outlet 220. Outlet 220 directs filtered water out of filter assembly 200. Thus, filter manifold 210 receives unfiltered water at inlet 214. Such unfiltered water passes through filter assembly 200 (and filter cartridge 204) and exits filter manifold 210 at outlet 220 as filtered water.

As illustrated and described herein, filter cartridge 204 is configured for filtering unfiltered water received at inlet 214 of filter manifold 210. Thus, filter cartridge 204 filters water passing through filter assembly 200. Filter cartridge 204 extends between a first end 222 and a second end 224, e.g., along the transverse direction T (e.g., when installed). A connection 226 of filter cartridge 204 is positioned at or proximate first end 222 of filter cartridge 204. Connection 226 of filter cartridge 204 is configured for engaging filter manifold 210, e.g., in order to removably mount filter cartridge 204 to filter manifold 210.

Connection 226 of filter cartridge 204 also places filter cartridge 204 in fluid communication with filter manifold 210 when filter cartridge 204 is mounted to filter manifold 210. Thus, filter cartridge 204 can receive unfiltered water from inlet 214 of filter manifold 210 at connection 226 and direct such unfiltered water into a chamber 228 when filter cartridge 204 is mounted to filter manifold 210. Water within chamber 228 can pass through a filtering media 230 positioned within chamber 228 and can exit chamber 228 as filtered water. In particular, connection 226 of filter cartridge 204 can direct filtered water out of chamber 228 to outlet 220 of filter manifold 210 when filter cartridge 204 is mounted to filter manifold 210. In such a manner, filtering media 230 of filter cartridge 204 can filter a flow of water through filter assembly 200, e.g., thereby improving the taste and/or safety of the water.

Filtering media 230 can include any suitable mechanism for filtering water within filter assembly 200. For example, filtering media 230 may include an activated carbon block, a reverse osmosis membrane, a pleated polymer or cellulose sheet, or a melt blown or spun cord media. In this manner, filtering media 230 can remove contaminants such as chlorine, chloroform, lead, arsenic, pharmaceuticals, microbes, and/or other undesirable substances from water supplied to refrigerator appliance 100. As used herein, the term "unfiltered" describes water that is not filtered relative to filtering media 230. However, as will be understood by those skilled in the art, filter assembly 200 may include additional filters that filter water entering chamber 228. Thus, "unfiltered" may be filtered relative to other filters but not filtering media 230. As will be understood and used herein, the term "water" includes purified water and solutions or mixtures containing water and, e.g., elements (such as calcium, chlorine, and fluorine), salts, bacteria, nitrates, organics, and other chemical compounds or substances.

According to exemplary embodiments, filter assembly 200 and its components may be formed from any material which is sufficiently rigid to support filter cartridge 204 and/or other assembly components. For example, filter housing 202 may be formed by injection molding, e.g., using a suitable plastic material, such as injection molding grade high impact polystyrene (HIPS) or acrylonitrile butadiene styrene (ABS). Alternatively, according to the exemplary embodiment, these components may be compression molded, e.g., using sheet molding compound (SMC) thermoset plastic.

Refrigerator appliance 100 also includes a control valve 232 as schematically shown in FIG. 3. Control valve 232 may be any valve suitable for regulating a flow of water to filter assembly 200, such as a solenoid valve. In this regard, control valve 232 is operably coupled to inlet conduit 212 and selectively shifts between a closed position and an open position. In the open position, control valve 232 permits the flow of water to filter assembly 200 for filtering before supplying it for end use, e.g., via dispensing assembly 140. Conversely, control valve 232 obstructs or blocks the flow of water to filter assembly 200 in the closed position such that water for filtering is not supplied to filter assembly 200 or is supplied to filter assembly 200 in an insubstantial volume. In such a manner, control valve 232 can regulate the flow of water to filter assembly 200 by shifting between the open and closed positions. Control valve 232 may be in communication with controller 156, and may operate in response to signals from controller 156. For example, as will be described below, controller 156 may close control valve 232 if filter cartridge 204 is malfunctioning or a leak is detected, if a newly installed filter cartridge 204 is not determined to be authentic, if filter cartridge 204 is not properly positioned/installed, if a filter cartridge needs to be replaced, or in the event of other service or performance issues related to the operation of refrigerator appliance 100.

As will be understood by those skilled in the art, filtering media 230 of filter cartridge 204 can lose efficacy over time. Thus, a user can replace filtering cartridge 204 and/or filtering media 230 of filter cartridge 204 at regular intervals, after a certain volume of water has passed through filter cartridge 204, after a certain contamination level has been reached, or when a filtering capacity drops below a threshold level. To replace filter cartridge 204 and/or filtering media 230 of filter cartridge 204, the user can remove or disconnect filter cartridge 204 from filter manifold 210 and insert or mount a new filter cartridge 204 or filtering media 230 of filter cartridge 204. Alternatively, filter cartridge 204 may be serviced or filtering media 230 may be changed or refreshed in order to ensure continuous, effective filtering of water flowing through filter assembly 200. However, it may be desirable to authenticate replacement of filter cartridges, e.g., to ensure consistent filtering performance, to capitalize on the revenue stream generated by replacement cartridges, to maintain quality standards, or to otherwise ensure a desirable performance of filter assembly 200. Thus, as discussed in greater detail below, refrigerator appliance 100 and filter assembly 200 may include features and methods of operation for authenticating filter cartridges 204.

Figure 5:
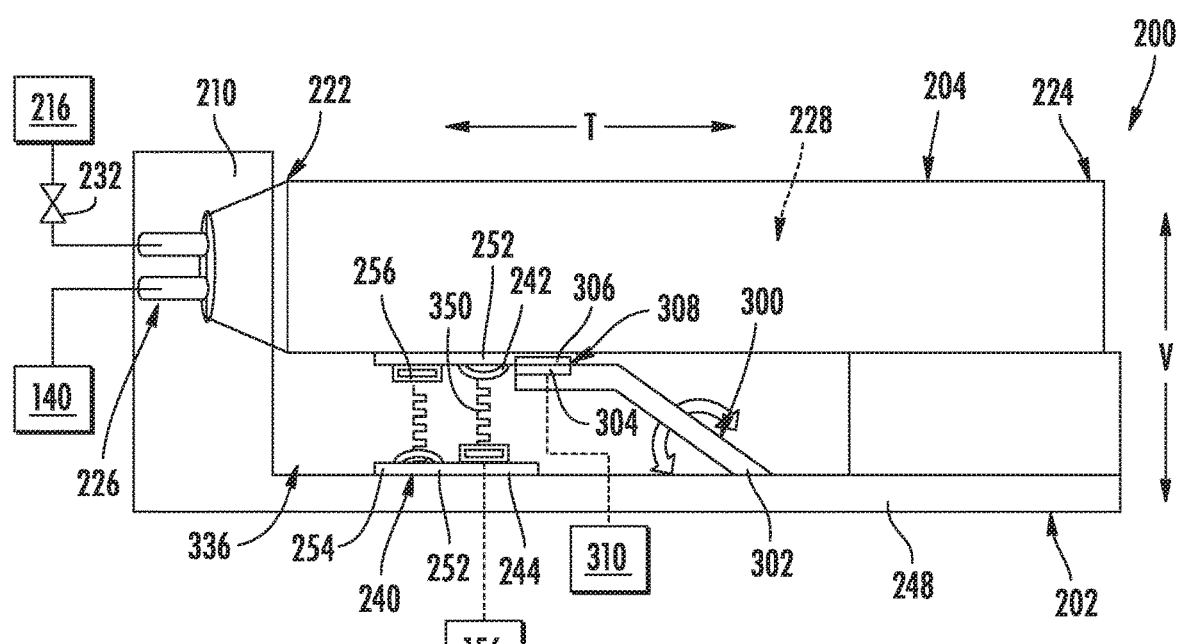
FIG. 5 provides a side schematic view of a filter authentication system that may be used with the exemplary filter assembly of FIG. 3 according to an exemplary embodiment of the present subject matter.
Figure 6:
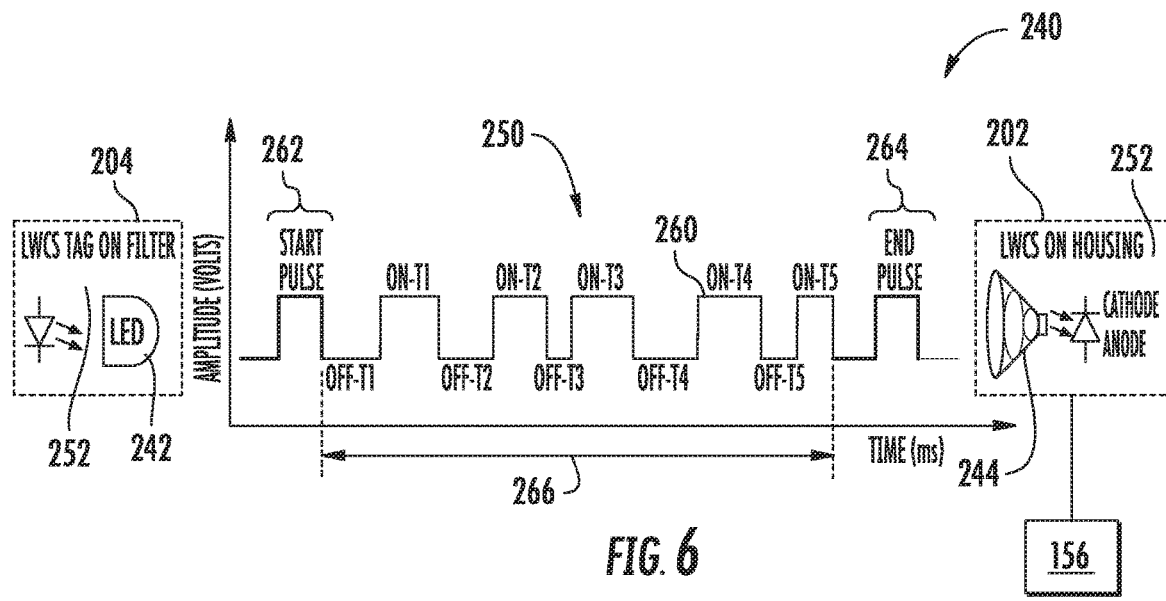
FIG. 6 provides a schematic representation of a filter identification signal transmitted using the exemplary filter authentication system of FIG. 5 according to an exemplary embodiment of the present subject matter.
Figure 7:
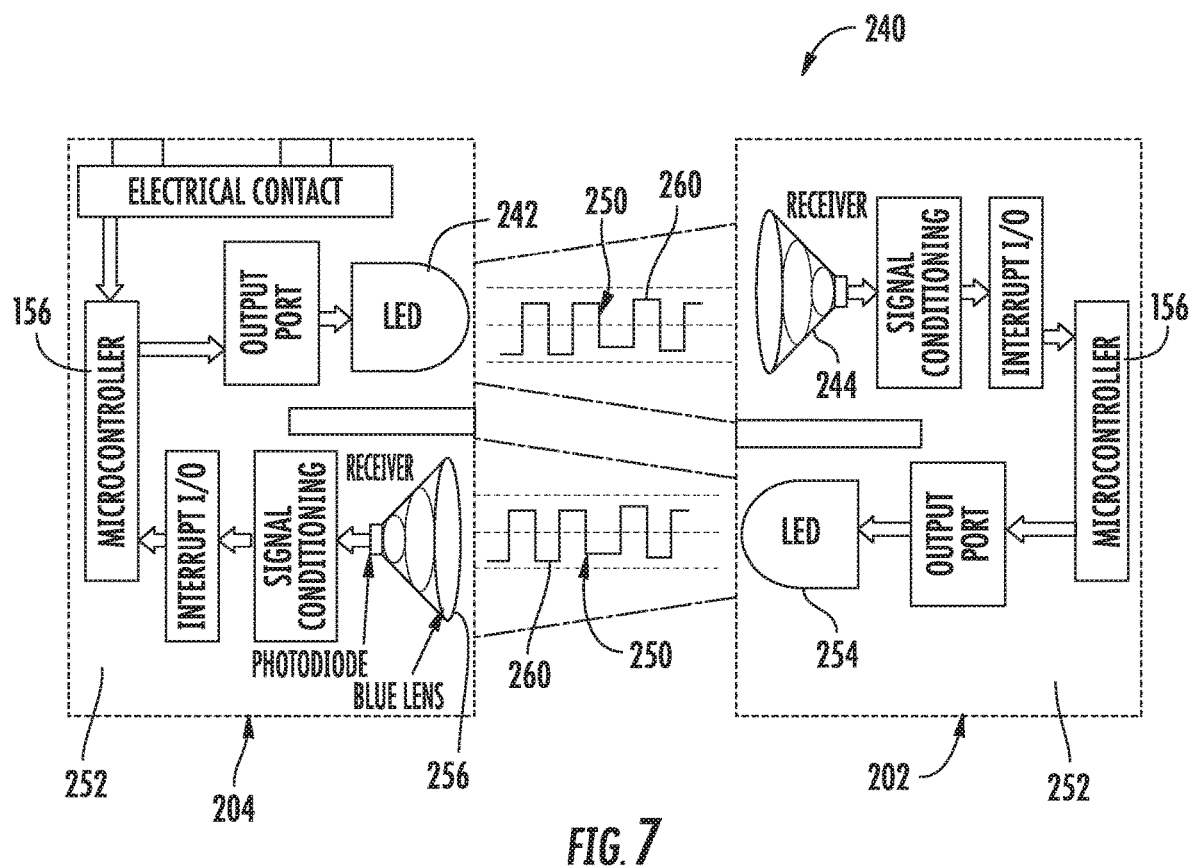
FIG. 7 provides a schematic representation of the exemplary filter authentication system of FIG. 5 according to an exemplary embodiment of the present subject matter.

Specifically, referring now also to FIGS. 5 through 7, refrigerator appliance 100 and filter assembly 200 may further include a filter authentication system 240. Filter authentication system 240 is generally configured for detecting the presence of and verifying the authenticity of filter cartridges 204 installed within filter assembly 200. Although filter authentication system 240 is described herein with respect to filter assembly 200, it should be appreciated that filter authentication system 240 can be used in any other suitable appliance for identifying and/or authenticating filter cartridges. Moreover, the authentication methods used herein may be used in any application for identifying and authenticating any part of a system or machine. In this manner, for example, original equipment manufacturers may use such an authentication system to ensure quality replacement parts are used in their original equipment devices.

According to an exemplary embodiment, filter authentication system 240 includes an optical emitter 242 for transmitting an optical signal and an optical receiver 244 for receiving that signal to facilitate an authentication process, as described below. More specifically, according to the illustrated embodiment, optical emitter 242 is mounted to filter cartridge 204, e.g., on an outer surface or sidewall 246 of filter cartridge 204. In addition, optical receiver 244 is mounted to filter housing 202 such that is positioned for proper communication with optical emitter 242 when filter cartridge 204 is properly installed within filter housing 202. In this regard, for example, optical receiver 244 may be positioned on a bottom wall 248 of filter housing 202 facing toward filter cartridge 204. As described below, filter housing 202 and/or filter cartridge 204 may include keyed features or alignment features configured for ensuring proper alignment of optical emitter 242 and optical receiver 244 when filter cartridge 204 is installed.

As explained herein, optical emitter 242 is generally configured for transmitting a filter identification signal (e.g., as identified by reference numeral 250 in FIGS. 6 and 7). In addition, optical receiver 244 is generally configured for receiving filter identification signal 250 from optical emitter 242 when filter cartridge 204 is installed in filter housing 202. Filter identification signal 250 may be transmitted only when filter cartridge 204 is installed, intermittently or constantly while filter cartridge 204 is installed, or at any other suitable frequency to facilitate authentication.

Optical emitter 242 may generally be any device or system of devices that are configured for generating an optical signal that may be transmitted to and read by optical receiver 244. For example, according to an exemplary embodiment, optical emitter 242 may generate visible or infrared light. In addition, optical emitter 242 may include any number of suitable light sources, using any suitable light technology, and illuminating in any suitable color or spectrum. For example, as used herein "light source" may refer to a light emitting diode (LED), which may illuminate in a single color, or which may each illuminate in multiple colors (e.g., multi-color or RGB LED) depending on the control signal from controller 156. Moreover, according to alternative embodiments, optical emitter 242 may include any other suitable traditional light bulbs or sources, such as halogen bulbs, incandescent bulbs, glow bars, a fiber light source, etc.

Similarly, optical receiver 244 may generally be any device or system of devices that are configured for receiving the optical signal generated by optical emitter 242. Specifically, according to an exemplary embodiment, optical receiver comprises a photodiode. By contrast, optical receiver 244 may be an optical camera, an infrared (IR) camera, a photomultiplier tube, a spectrometer, a light dependent resistor, an optocoupler, or another optical or spectral sensor configured for measuring electromagnetic energy in any frequency spectrum(s), such as infrared (IR), ultraviolet (UV), visible light, etc.

According to the illustrated embodiment, each of optical emitter 242 and optical receiver 244 are mounted on printed circuit boards 252, which may be positioned on filter cartridge 204 and filter housing 202, respectively. According to alternative embodiments, optical emitter 242 and optical receiver 244 may be mounted on filter housing 202 and filter cartridge 204 in any other suitable manner. In addition, any suitable manner of providing power to or energizing optical emitter 242 and optical receiver 244 may be used while remaining within the scope of the present subject matter. Exemplary methods of providing such power will be described below according to exemplary embodiments of the present subject matter.

As illustrated schematically in FIG. 6, filter authentication system 240 includes a single optical emitter 242 for transmitting filter identifier signal 250 to a single optical receiver 244. However, it should be appreciated that according to other embodiments, each of filter housing 202 and filter cartridge 204 may include an optical emitter 242 and optical receiver 244. Specifically, such a configuration is shown for example in FIG. 7, which establishes bidirectional communication between filter cartridge 204 and filter housing 202. In this regard, filter housing 202 still includes optical receiver 244, but may further include a housing emitter 254 mounted adjacent optical receiver 244. Notably, housing emitter 254 may operate similar to or be identical to optical emitter 242 which is attached to filter cartridge 204. Similarly, filter cartridge 204 may still include optical emitter 242, but may further include a cartridge receiver 256 adjacent optical emitter 242. Cartridge receiver 256 may operate similar to or be identical to optical receiver 244. In this manner, two-way communication may be established between filter housing 202 and filter cartridge 204, e.g., by transmitting a first signal from optical emitter 242 to optical receiver 244 and a second single from housing emitter 254 to cartridge receiver 256. By enabling two-way communication between filter housing 202 and filter cartridge 204, enhanced interrogation techniques may be used to identify and authenticate filter cartridge 204, as described below.

According to still other embodiments, each of filter housing 202 and filter cartridge may include a single light emitting diode (LED) that operates in two modes to both generated and receive the filter identification signal 250. In this regard, according to an exemplary embodiment, optical emitter 242 and optical receiver 244 may both be LEDs that are configured to operate in an emitting diode in a receiving mode, respectively. In this regard, an LED operating in emitting mode may generate a pulse train of light (described further below) in response to an electrical input corresponding to that pulse train. By contrast, an LED operating in receiving mode may generate a small pulse train electrical output corresponding to the light received. By sensing and emitting light using bidirectional LEDs, a very low cost but effective communication system may be established.

Referring now to FIG. 6 and only describing the unidirectional communication system for simplicity, filter identification signal 250 will now be described in more detail according to an exemplary embodiment of the present subject matter. Specifically, as illustrated, filter identification signal 250 may facilitate a light wave communication system (LWCS) between optical emitter 242 and optical receiver 244. The LWCS system uses visible light, infrared light, or light at any other suitable wavelength to communicate information using light waves. Notably, information contained in such light waves may be encoded or encrypted for security and to prevent hacking, tampering, or fraudulent misuse.

Specifically, filter identification signal 250 may include a pulse train 260 of light energy, e.g., illustrated as a sequence of ON and OFF times of optical emitter 242 in FIG. 6. Specifically, according to the illustrated embodiment, pulse train 260 may be divided up into or may include a fixed length start pulse 262 and a fixed length end pulse 264 to identify a fixed time data package 266 therebetween. In this regard, for example, the fixed length ON time 262 have a known duration, e.g., 20 ms which may be followed by a fixed time data package 266 of a known duration, e.g., 300 ms, and subsequently followed by a fixed length OFF time 264 of known duration, e.g., 20 ms. It should be appreciated that the times used herein are only exemplary and not intended to limit the scope of the present subject matter. For example, the fixed length ON time 262 may have a duration different than fixed length OFF time 264, the fixed time data package may have a different duration, the pulse amplitudes may vary, etc.

According to exemplary embodiments, the pulse duration of each pulse within fixed time data package 266 may represent a certain code, quantity, or other qualitative information useful to controller 156 or the user. For example, the duration of the first pulse (e.g., T1) may indicate a date of manufacturing, the duration of the second pulse (e.g., T2) may indicate a production batch, the duration of the third pulse (e.g., T3) may identify the filter manufacturer, the duration of the fourth pulse (e.g., T4) may identify a type of algorithm to decode the filter identification signal 250, etc. It should be appreciated that according to alternative embodiments, the data stored in fixed time data package 266 may vary while remaining within scope of the present subject matter.

As best shown in FIGS. 5 and 6, a controller is in operative communication with optical receiver 244 for receiving, decoding, and analyzing light received from optical emitter 242, e.g., in the form of filter identification signal 250 or pulse train 260. Specifically, according to the illustrated embodiment, the controller may be appliance controller, e.g. controller 156. However, according to alternative embodiments, filter assembly 200 may have a dedicated controller for communicating with filter cartridges 204.

As described in more detail below, filter cartridge 204 (or more specifically optical emitter 242) may communicate with controller 156 of refrigerator appliance 100 to provide information regarding its authenticity. Controller may then make a determination as to whether filter cartridge 204 is authentic and adjust operation of refrigerator appliance 100 accordingly. For example, controller 156 may further be in communication with control valve 232 for regulating the flow of water through filter assembly 200. Thus, if controller 156 determines that filter cartridge 204 is not authentic, controller 156 may close control valve 232 to prevent the flow of water therethrough. Alternatively, controller 156 may provide a notification to the user of refrigerator appliance 100, e.g., using display 158 and/or sound generator 160.

According to exemplary embodiments, fixed time data package 264 may transfer data at any suitable rate, such as between about 10 and 200 kilobits per second (kbps), between about 30 and 120 kbps, between about 50 and 100 kbps, or about 75 kbps. It should be appreciated that as used herein, terms of approximation, such as "approximately," "substantially," or "about," refer to being within a ten percent margin of error.

Now that the construction and configuration of refrigerator appliance 100, filter assembly 200, and filter authentication system 240 have been described according to exemplary embodiments of the present subject matter, an exemplary method 400 for using a filter assembly and authentication system to authentic a filter cartridge will be described according to an exemplary embodiment of the present subject matter. Method 400 can be used to operate filter assembly 200 and filter authentication system 240, or may be used to operate any other suitable filter assembly or component identification system. In this regard, for example, controller 156 may be configured for implementing some or all steps of method 400. Further, it should be appreciated that the exemplary method 400 is discussed herein only to describe exemplary aspects of the present subject matter, and is not intended to be limiting.

Figure 8:
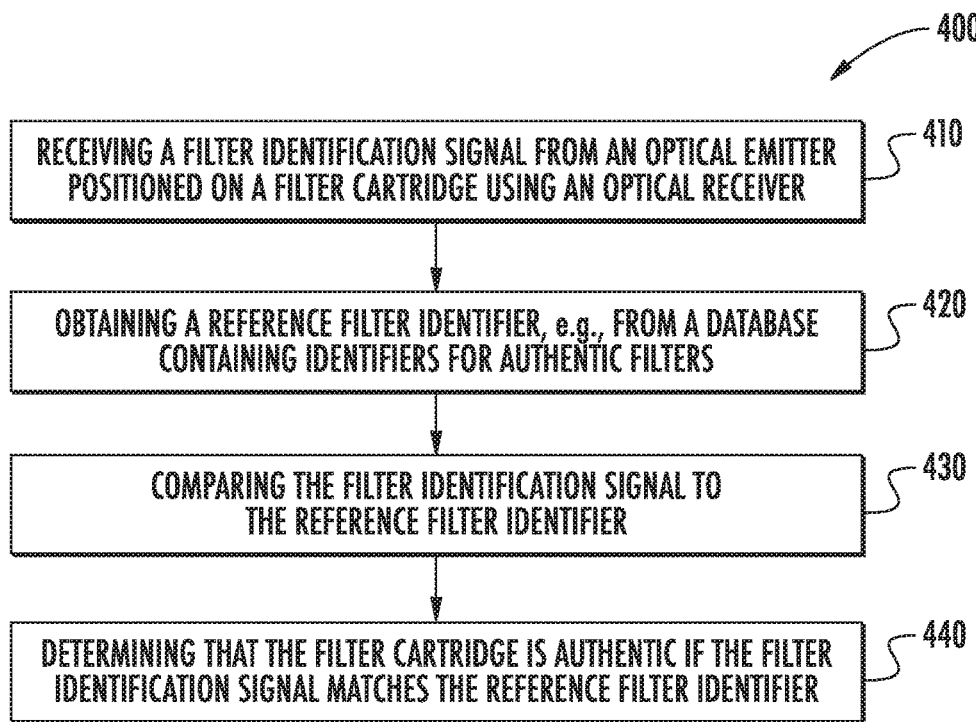
FIG. 8 is a method of authenticating filter cartridges using the exemplary filter authentication system of FIG. 5 according to an exemplary embodiment of the present subject matter.

Referring now to FIG. 8, method 400 includes, at step 410, receiving a filter identification signal from an optical emitter positioned on a filter cartridge using an optical receiver. Continuing the example from above, filter identification signal 250 may be transmitted from optical emitter 242 to optical receiver 244 and may be analyzed by a receiver microcontroller or controller 156. As described above, filter identification signal 250 may include a pulse train 260 containing a fixed time data package 266. Specifically, a fixed ON time 262 may precede fixed time data package 266 and a fixed OFF time 264 may follow. According to an exemplary embodiment, these ON and OFF times may be fixed time across all tags used in different filters compatible for use with filter assembly 200 and manufactured by a particular manufacturer. After the start pulse, a varying ON & OFF pulse train (i.e., fixed time data package 166) will be generated and contains genuine filter identification information which is unique to compatible filters or manufacturer-made filters. According to exemplary embodiments, fixed time data package 166 may have a constant duration for all tags on filter cartridges compatible for use with a filter assembly 200.

Step 420 may further include obtaining a reference filter identifier. As used herein, "reference filter identifier" and the like is intended to refer to a filter code, key, or other indicia of authenticity which may be used to verify a newly installed filter cartridge. For example, a plurality of reference filter identifiers may be stored in a database either on controller 156 or on a remote network accessible by controller 156 or refrigerator appliance 100. For example, the manufacturer of refrigerator appliance 100 may store an external database including reference filter identifiers for all compatible replacement of filter cartridges.

Step 430 includes comparing the filter identification signal to the reference filter identifier. In this regard, controller 156 may compare the filter identification signal 250 received from the filter cartridge 204 to one or more of the reference filter identifiers from the database. Step 440 includes determining that the filter cartridge is authentic if the filter identification signal matches the reference filter identifier. In this regard, upon comparing the filter identification signal 250 to each of the reference filter identifiers, filter cartridge 204 is identified as authentic only if it matches a reference filter identifier that is obtained or stored in the database. By contrast, controller 156 may determine that filter cartridge 204 is not authentic if no match is found. Controller 156 may further implement action in response to such a determination, e.g., by opening or closing control valve 232.

Although the example above refers to implementing method 400 using refrigerator appliance 100, filter assembly 200, and filter authentication system 240, it should be appreciated that method 400 may be used to authenticate filter cartridges for any suitable filter assembly or to authenticate parts of for any suitable system or machine. For example, alternative communication protocols may be used, different filter assembly configurations may be employed, and other variations may be made while remaining within the scope of the present subject matter.

FIG. 8 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using refrigerator appliance 100, filter assembly 200, and filter authentication system 240 as an example, it should be appreciated that these methods may be applied to identifying components in any system.

Notably, filter authentication system 240 may require electrical power for operation. For example, printed circuit boards 252 may be provided with electrical power which may be transmitted to optical emitter 242 to generate the desired filter identification signal 250. Thus, aspects of the present subject matter are directed to features which may provide such electrical power to filter cartridge 204. For example, referring now specifically to FIGS. 9 through 14, various such electrical power systems will be described according to exemplary bottoms the present subject matter.

Figure 9:
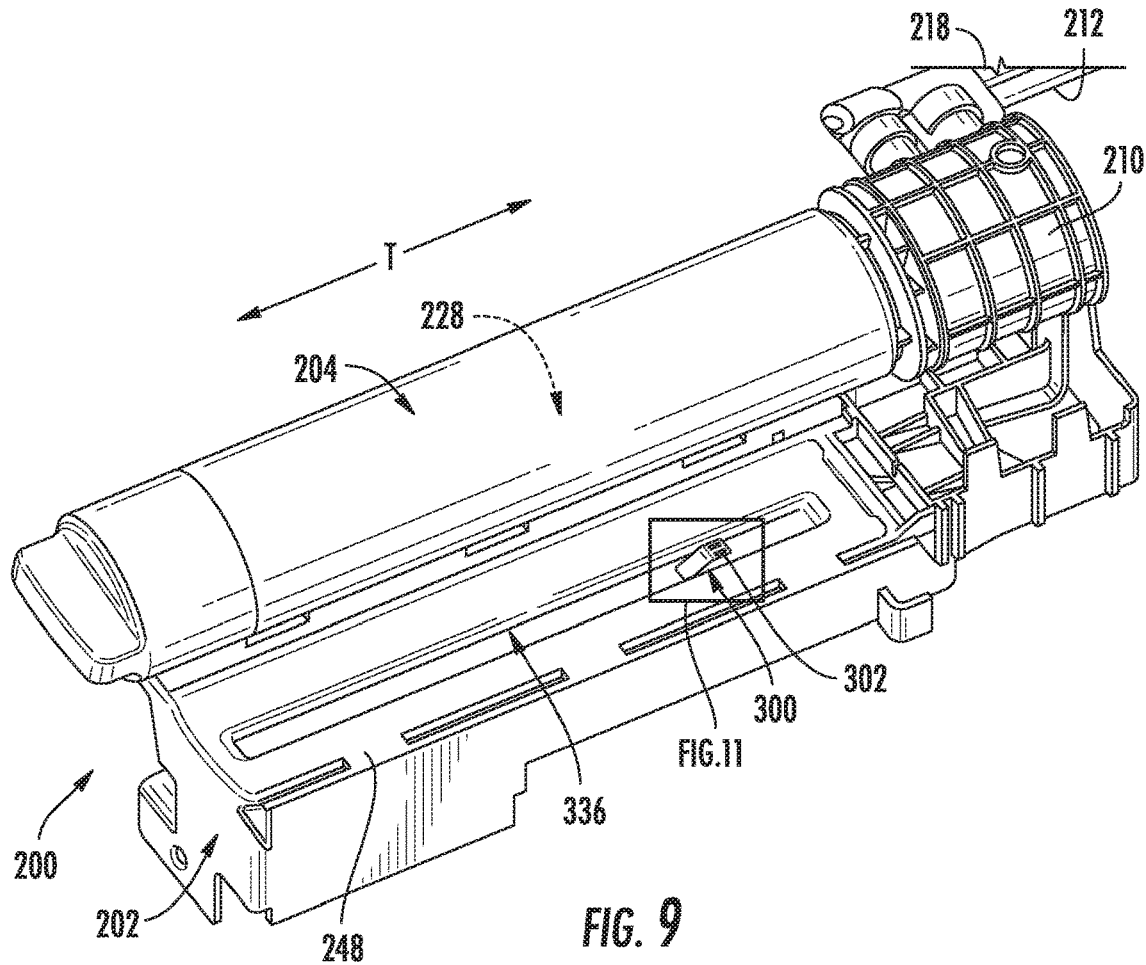
FIG. 9 provides a perspective view of the exemplary filter assembly of FIG. 3 including an electrical contact member according to an exemplary embodiment of the present subject matter.
Figure 10:
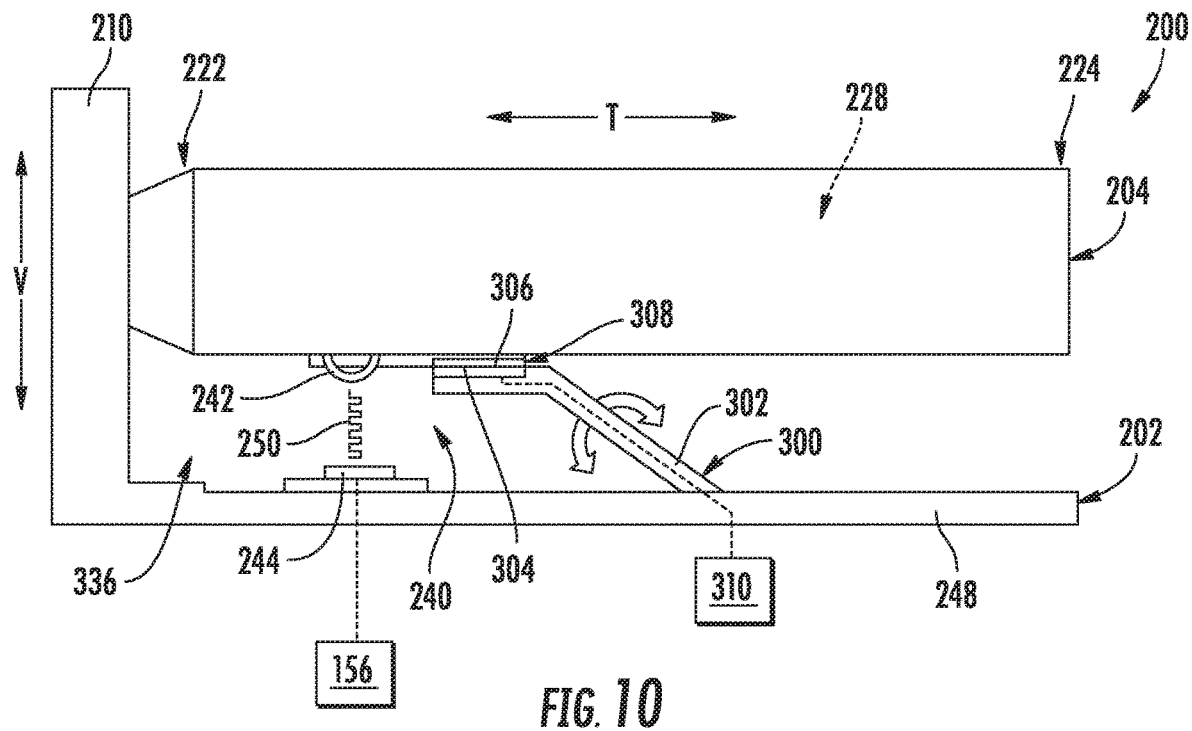
FIG. 10 provides a side schematic view of the exemplary filter assembly and contact member of FIG. 9 according to an exemplary embodiment of the present subject matter.
Figure 11:
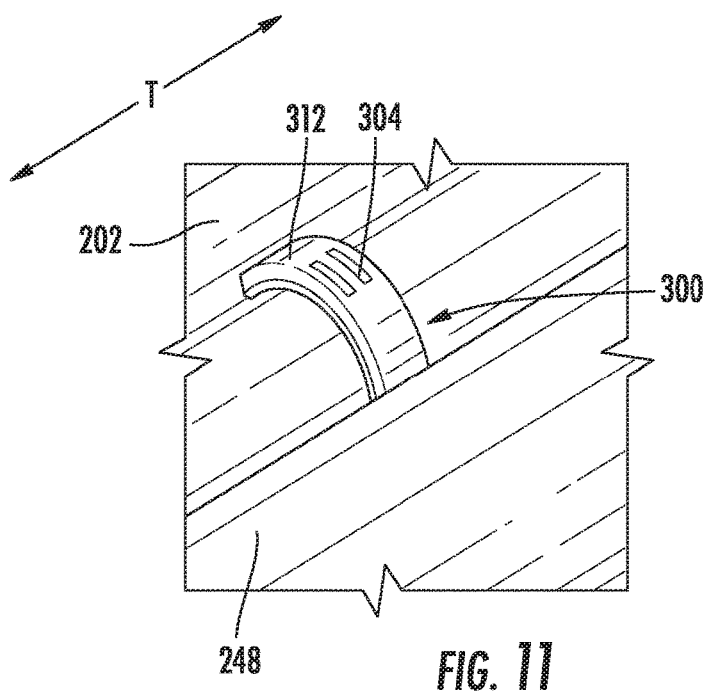
FIG. 11 provides a perspective view of an electrical contact member that may be used with the exemplary filter assembly of FIG. 3 according to an exemplary embodiment of the present subject matter.
Figure 12:
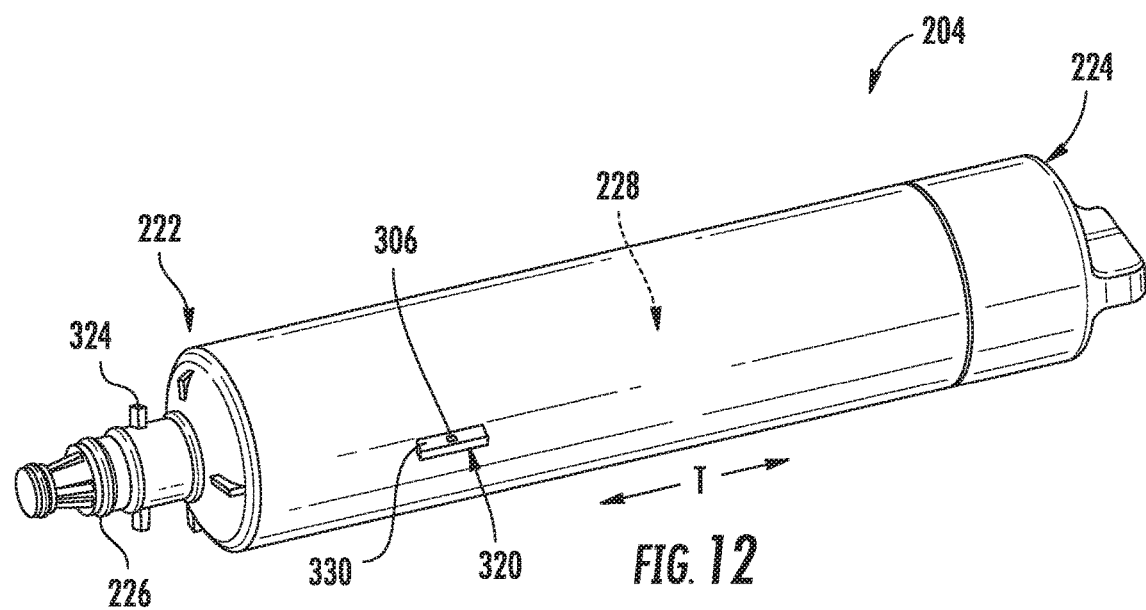
FIG. 12 provides a perspective view of a filter cartridge that may be used with a filter assembly according to an exemplary embodiment of the present subject matter.

Specifically, referring for example to FIGS. 9 and 10, filter assembly 200 may include a contact member 300 that extends from the filter housing 202 for engaging filter cartridge 204 when filter cartridge 204 is in an installed position (e.g., as illustrated in FIG. 9), as opposed to an uninstalled position (e.g. as shown in FIG. 12). Specifically, as shown in FIGS. 9 and 10, contact member 300 includes a resilient arm 302 that extends away from bottom wall 248 of filter housing 202 and is urged into contact with filter cartridge 204 when installed. Specifically, resilient arm 302 extends upward along the vertical direction V and toward a rear of filter housing 202 (e.g. toward filter manifold 210) so that it may easily deflect when filter cartridge 204 is installed.

At a distal end of contact member 300, i.e., resilient arm 302, a first contact 304 may be positioned such that it faces toward an installed filter cartridge 204. In addition, a second contact 306 may be mounted to filter cartridge 204 (e.g., to printed circuit board 252) such that first contact 304 and second contact 306 establish an electrical connection 308 when filter cartridge 204 is in the installed position. According to an exemplary embodiment, first contact 304 may be electrically coupled to a power supply 310 (FIG. 10) for providing electrical power to filter cartridge 204 (e.g., or more specifically printed circuit board 252) through electrical connection 308. For example, power supply 310 may part of or supplied by controller 156 of refrigerator appliance 100. In this manner, according to exemplary embodiments, power supply 310 may provide electrical power to optical emitter 242, e.g., to facilitate the operation of filter authentication system 240.

Notably, electrical connection 308 may be further used to provide valuable information regarding the position of filter cartridge 204. For example, according to an exemplary embodiment, controller 156 is operably coupled to first contact 304. In this manner, when filter cartridge 204 is properly installed, second contact 306 may be electrically coupled to first contact 304 to establish electrical connection 308. Thus, controller 156 may know that if electrical connection 308 is established, filter cartridge 204 is properly positioned within filter housing 202. If such electrical connection 308 is established, controller 156 may open control valve 232 to permit water to flow through filter assembly 200. By contrast, controller 156 may be configured for closing control valve 232 if electrical connection 308 is not established.

Resilient arm 302 is only one exemplary contact member 300 suitable for establishing electrical connection 308 between filter housing 202 (e.g., or more specifically power supply 310) and filter cartridge 204 (e.g. or more specifically printed circuit board 252). For example, referring briefly to FIG. 11, contact member 300 could alternatively be a semicircular member 312 which is placed in compression when filter cartridge 204 is installed. In this regard, first contact 304 may be positioned at a top of semicircular member 312 (e.g., at the farthest point away from bottom wall 248 along the vertical direction V).

Figure 13:
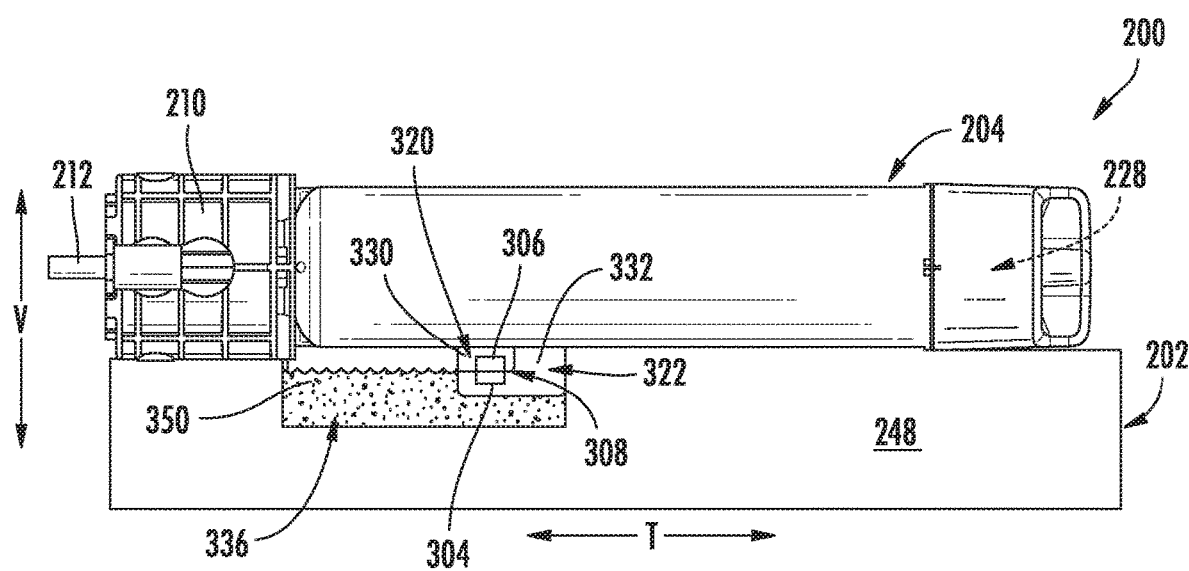
FIG. 13 provides a side schematic view of the exemplary filter assembly of FIG. 12 according to an exemplary embodiment of the present subject matter.

According to an alternative embodiment illustrated in FIGS. 12 and 13, filter cartridge 204 may define an alignment feature 320 and filter housing 202 may define a complementary feature 322. In general, filter cartridge 204 is properly installed when the alignment feature 320 engages complementary feature 322. It should be appreciated that alignment feature 320 and complementary feature 322 may be any suitable features. For example, according to an exemplary embodiment, alignment feature 320 is one or more radial lugs 324 (FIG. 12) that extend radially outward from connection 226. Radial lugs 324 may be configured for engaging a complementary keyed slot 326 (identified schematically in FIG. 13) defined in filter manifold 210.

Referring still to FIGS. 12 and 13, alignment feature 320 may include a radially extending member or tag 330 which extends from sidewall 246 of filter cartridge 204. Complementary feature 322 may include a wall or stopping member 332. In this regard, stopping member 332 may be defined in a drain trough 336 defined by the filter housing 202. In this manner, filter cartridge 204 may be rotated until radially extending tag 330 engages stopping member 332 to properly position filter cartridge 204 within filter housing 202. In this regard, filter cartridge 204 is in the proper position only when radially extending tag 330 extends downward along the vertical direction V. According to an exemplary embodiment, first contact 304 may be positioned on stopping member 332 and second contact 306 may be positioned on radially extending tag 330 to form electrical connection 308.

Figure 14:
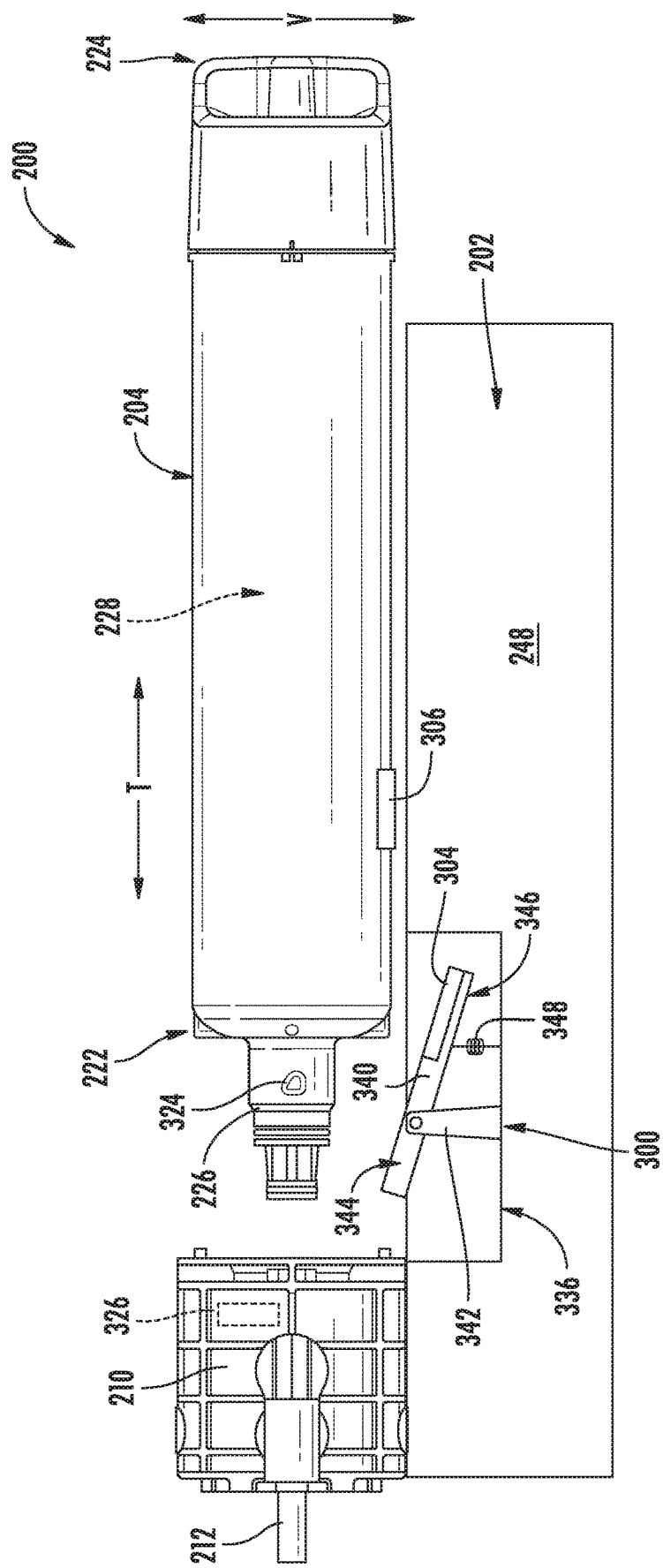
FIG. 14 provides a side schematic view of a filter assembly according to an exemplary embodiment of the present subject matter.
Figure 15:
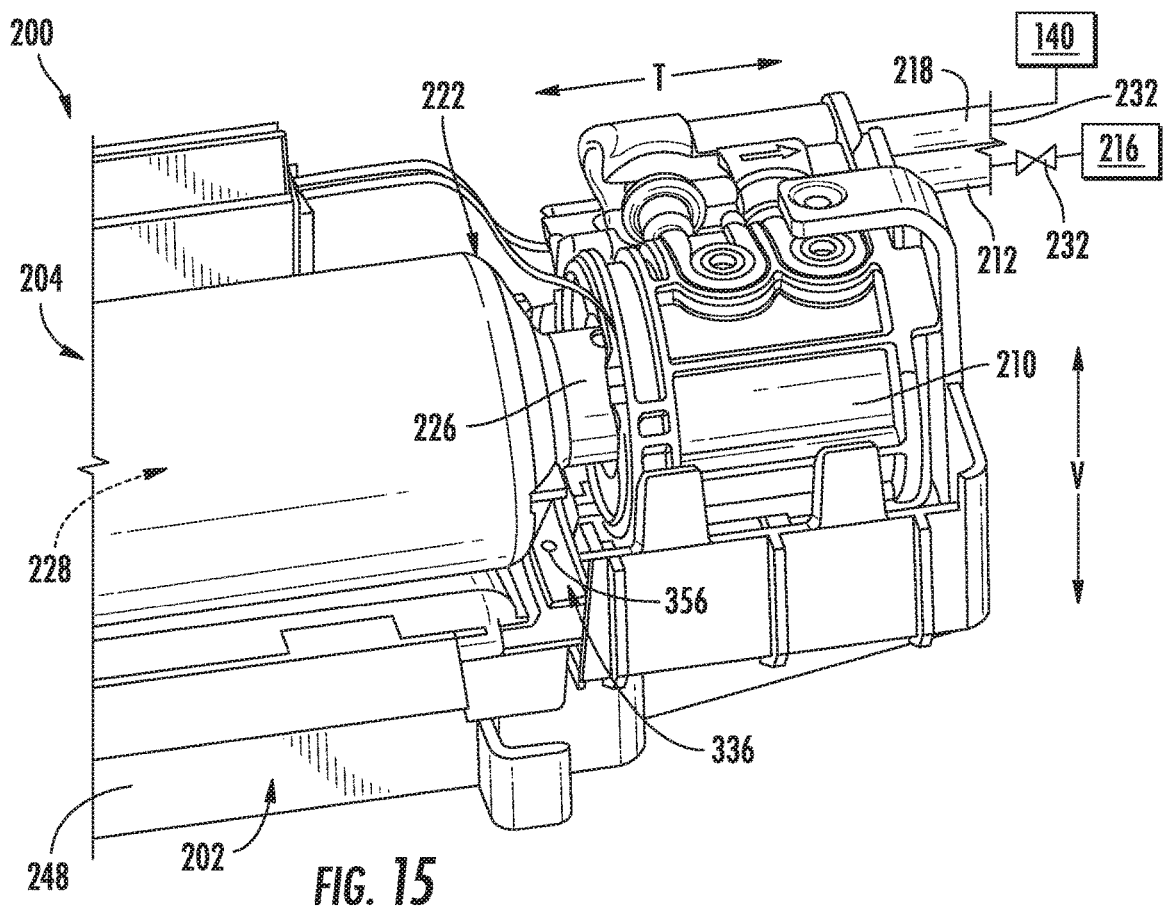
FIG. 15 provides a perspective view of a filter assembly according to an exemplary embodiment of the present subject matter.
Figure 16:
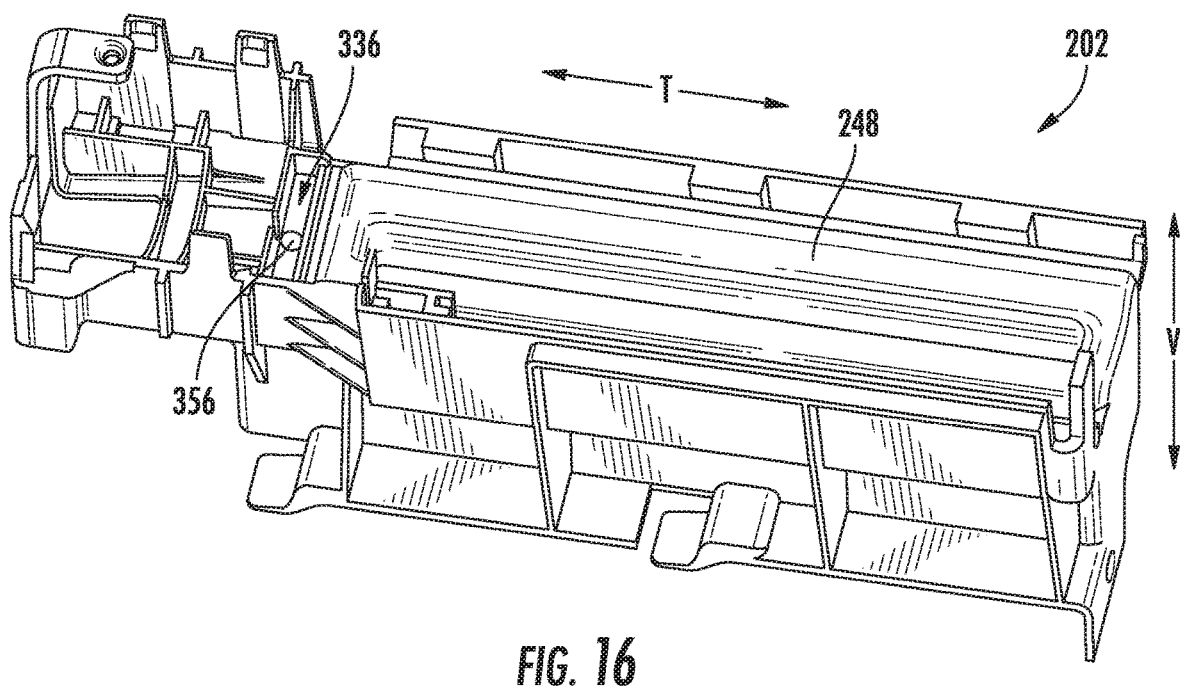
FIG. 16 provides a top, perspective view of a filter housing of the exemplary filter assembly of FIG. 15 according to an exemplary embodiment of the present subject matter.
Figure 17:
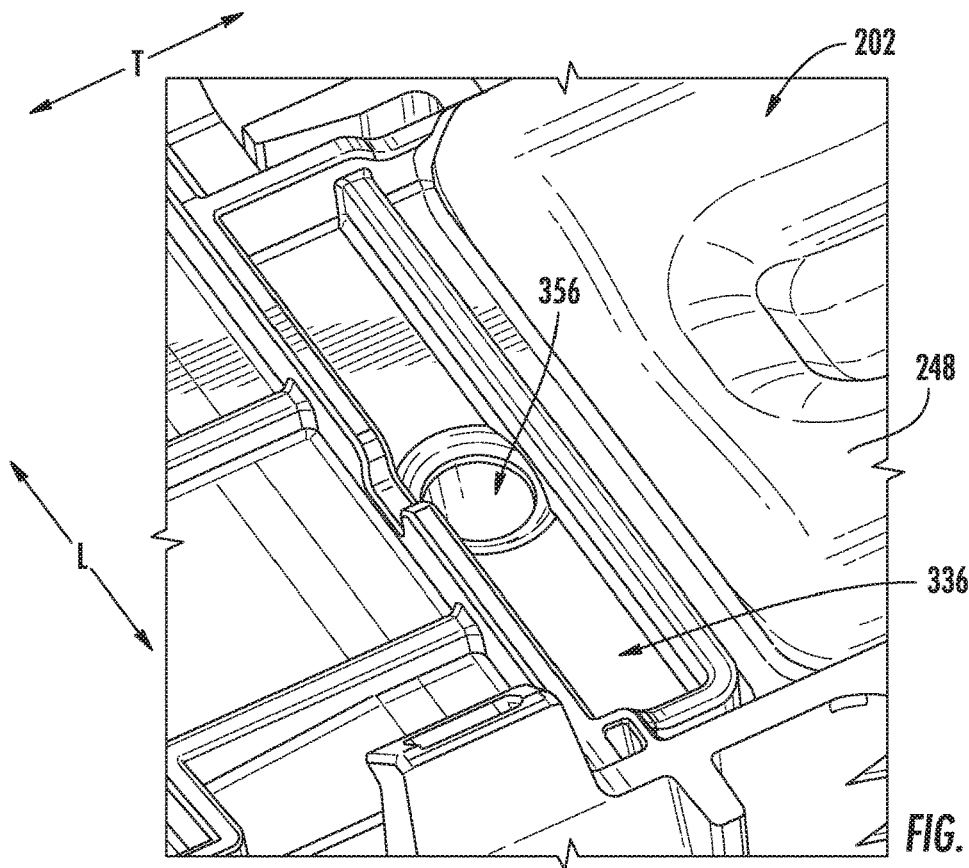
FIG. 17 provides a top view of a drain trough of the exemplary filter housing of FIG. 16 according to an exemplary embodiment of the present subject matter.

According to still another embodiment illustrated in FIG. 14, contact member 300 includes a pivoting arm 340 that is mounted to filter housing 202 within drain trough 336. More specifically, as illustrated, pivoting arm 340 is pivotally supported by a vertical member 342 and includes a lever arm 344 positioned proximate filter manifold 210 relative to the vertical member 342 and a contact portion 346 positioned opposite lever arm 344 relative to vertical member 342. Furthermore, a biasing member 348 (e.g., such as a mechanical spring) urges contact portion 346 of pivoting arm 340 toward filter housing 202, e.g., toward the bottom wall 248. In this manner, lever arm 344 extends away from filter housing 202 and engages filter cartridge 204 when installed to pivot contact portion 346 into contact with filter cartridge 204. Notably, first contact 304 may be mounted on contact portion 346 for pivoting into contact with second contact 306 when filter cartridge 204 is installed to establish electrical connection 308 as described above.

It should be appreciated that the methods of establishing electrical contact between optical emitter 242 (or filter cartridge 204 more generally) and filter housing 202 are only exemplary and not intended to limit the scope of the present subject matter. Moreover, it should be appreciated that wireless methods for powering optical emitter 242 may be used according to alternative embodiments while remaining within the scope of the present subject matter. In this regard, for example, optical emitter 242 may be powered directly or indirectly using any suitable power transfer technology, such as inductive coupling, resident inductive coupling, capacitive coupling, magneto dynamic coupling, microwaves (e.g., phased arrays), lightwaves (e.g., photocells), etc.

During operation, filter assembly 200 can be exposed to a variety of conditions that can negatively affect performance of filter assembly 200. For example, high water pressure at inlet 214 of filter manifold 210 and/or connection 226 of filter cartridge 204 or exposing filter assembly 200 to freezing conditions can negatively affect performance of filter assembly 200. Such conditions can cause filter assembly 200 to leak, e.g., at connection 226 of filter cartridge 204. Such conditions can also cause filter assembly 200 to deform or crack. As discussed in greater detail below, filter assembly 200 includes features for detecting such malfunctions of filter assembly 200 or for detecting water leaks within filter assembly 200.

Specifically, referring again to FIGS. 9, 13, and 14, filter housing 202 and filter cartridge 204 may be designed such that electrical connection 308 is established in a location where water would collect if it leaked from filter assembly 200. In this regard, electrical connections 308 in each of these embodiments are located within drain trough 336 or otherwise proximate bottom wall 248 of filter housing 202. In this manner, if a leak occurs, leaked water (e.g., as defined by reference numeral 350) may collect within drain trough 336 or otherwise pass over electrical connection 308, thereby shorting electrical connection 308. Controller 156 may be operably coupled to first contact 304 and may be configured for determining that a leak exists if electrical connection 308 is shorted. Furthermore, controller 156 may be configured for closing control valve 232 if electrical connection 308 is not established, is shorted, or is otherwise operating abnormally. In this manner, controller 156 may regulate control valve 232 to prevent the flow of water through a filter assembly 200 in the event that there is a leak or filter cartridge 204 is not installed properly.

Referring now also to FIGS. 15 through 20, an alternative leak detection assembly 354 will be described according to an exemplary embodiment of the present subject matter. Leak detection assembly 354 is generally configured for facilitating leak detection using controller 156. Due to the similarity with filter assembly 200 described above, like reference numerals may be used to refer to the same or similar features between the various embodiments described herein.

According to an exemplary embodiment, leak detection assembly 354 includes a drain trough 336 that is positioned below filter cartridge 204 for collecting leaked water 350. As used herein, "drain trough" may be used to refer to any reservoir, collection chamber, gutter, or other features defined and or mounted to filter housing 202 which are intended to collect leaked water 350 within filter assembly 200. In this regard, as illustrated best in FIGS. 16 and 17, drain trough 336 extends along the lateral direction L approximately directly below the interface between filter cartridge 204 and filter manifold 210, e.g., below connection 226. Notably, the most likely place for filter assembly 200 to leak is the interface between filter manifold 210 and filter cartridge 204. Therefore, by positioning drain trough 336 immediately below this interface, leaked water 350 has a tendency to fall under the force of gravity into drain trough 336 where it may be collected or may otherwise pass from filter assembly 200.

Figure 18:
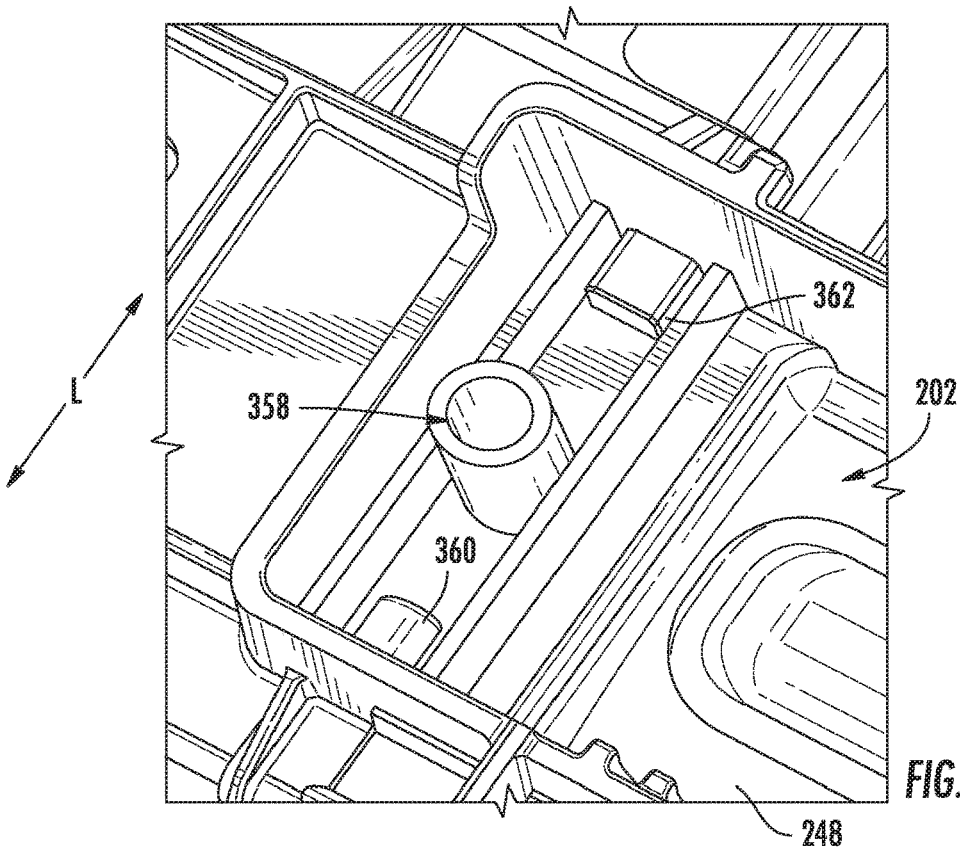
FIG. 18 provides a bottom view of the exemplary drain trough of FIG. 17 according to an exemplary embodiment of the present subject matter.
Figure 19:
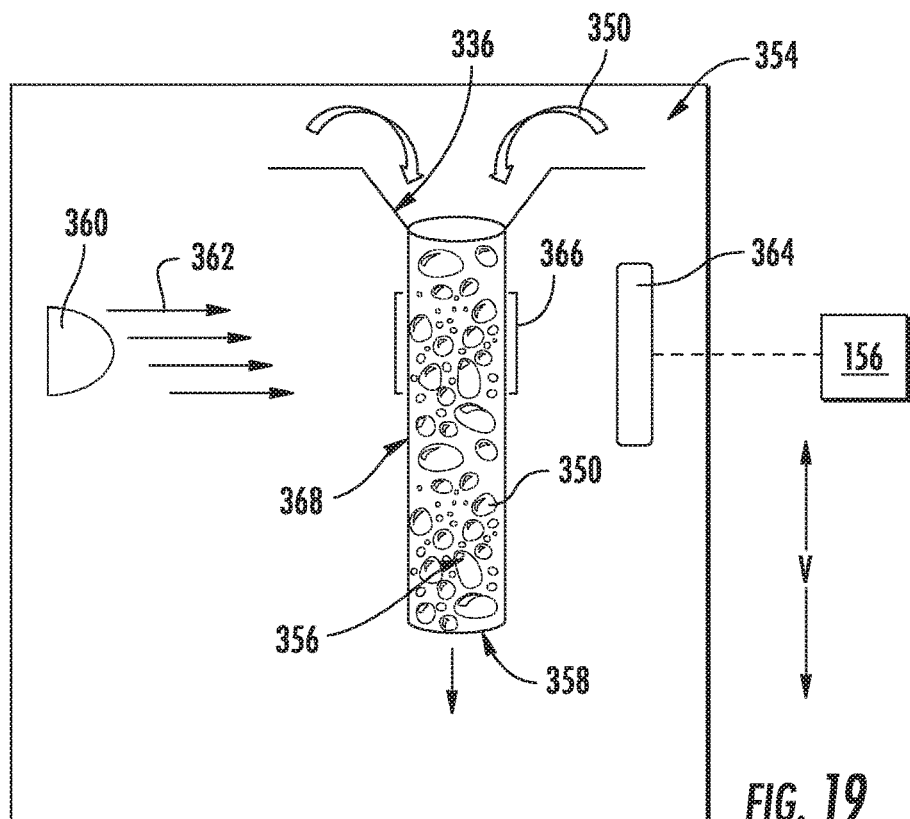
FIG. 19 provides a schematic view of a leak detection assembly for use with a filter assembly according to an exemplary embodiment of the present subject matter.
Figure 20:
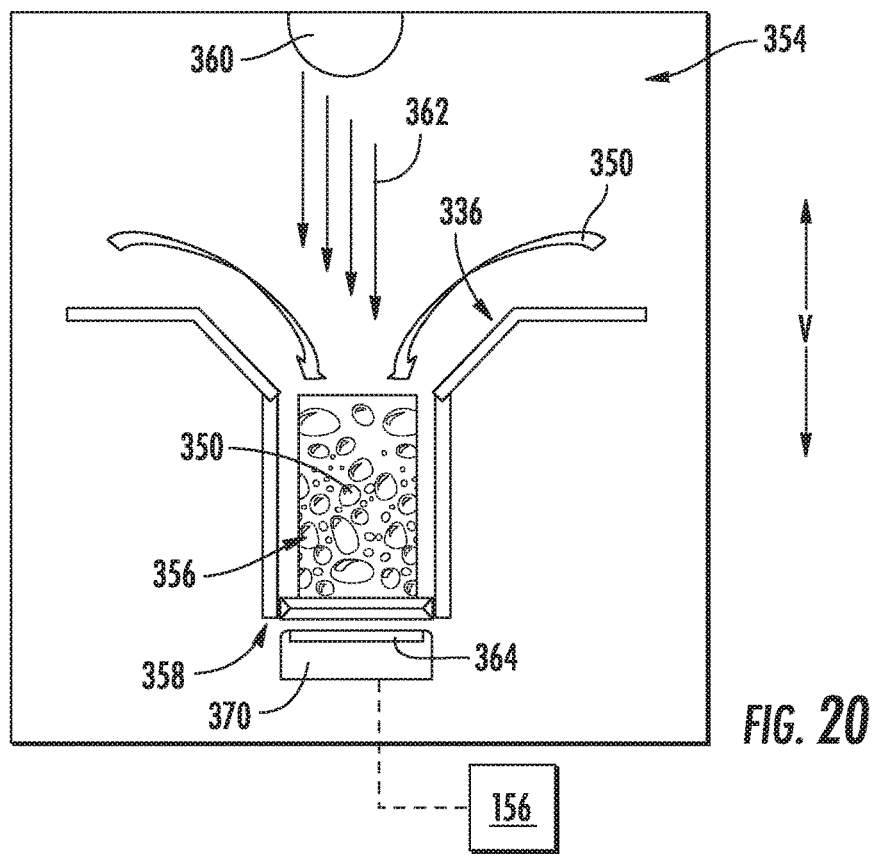
FIG. 20 provides another schematic view of a leak detection assembly for use with a filter assembly according to an exemplary embodiment of the present subject matter.

As best shown in FIGS. 18 and 19, drain trough 336 may taper toward a collection tube 356 which is fluidly coupled to drain trough 336 and extends downward along the vertical direction V. According to this exemplary embodiment, a bottom end 358 of collection tube 356 is open such that leaked water 350 may pass through and out of collection tube 356. In this manner, leaked water 350 may be first collected in drain trough 336 before being directed down collection tube 356, e.g., toward an external drain. Collection tube 356 may be defined by filter housing 202 or may be attached directly to drain trough 336. In addition, collection tube 356 and drain trough 336 may be constructed from a transparent material through which light may pass, which facilitates leak detection monitoring as described in more detail below.

Referring still to FIGS. 18 and 19, filter assembly 200 may further include a light source 360 positioned proximate drain trough 336 or collection tube 356 for directing light (e.g., as indicated by reference numeral 362) through drain trough 336 or collection tube 356. In addition, filter assembly 200 may include a light sensor 364 positioned proximate drain trough 336 or collection tube 356 for sensing light 362 emitted by light source 360. According to an exemplary embodiment, light source 360 may be similar to optical emitter 242 and light sensor 364 may be similar to optical receiver 244 for facilitating an authentication procedure as described above. However, according to alternative embodiments, light source 360 may be an LED and light sensor 364 may be a photodiode. Alternatively, any suitable light source and sensing device (e.g., similar to that described above) may be used according to alternative embodiments.

Controller 156 may be operably coupled to light sensor 364 and may be configured for determining that a leak exist when an intensity of sensed light 362 is reduced by leaked water 350. In this regard, the intensity of light may generally refer to any measurable quantitative or qualitative property of light 362 generated by light source 360. In this regard, when filter cartridge 204 is installed into filter housing 202, light source 360 may be illuminated and the intensity of the light 362 may be continuously monitored. However, when a leak occurs, leaked water 350 collects in drain trough 336 and/or collection tube 356 where it distorts, diminishes, or otherwise alters the intensity of light 362 transmitted to light sensor 364. Controller 156 may be configured for detecting that change in intensity.

Furthermore, controller 156 may be configured for implementing corrective action in response to a detected change in light intensity. For example, controller 156 may be configured for closing control valve 232 if leaked water 350 is detected. Alternatively, controller 156 may provide a notification to the user of refrigerator appliance 100, e.g., by providing a notification via display 158 or sound generator 160.

Notably, due to the exposure to cold temperatures, condensate may have a tendency to form on an outside of collection tube 356. Thus, according to an exemplary embodiment, a transparent heater 366 (e.g., such as a transparent film heater) may be wrapped around an outside 368 of collection tube 356 for periodically heating collection tube 356 to prevent the collection of condensate. In this manner, false leaks will not be triggered due to changes in light intensity from condensate. Instead, leaks will only be signaled when leaked water 350 flows into drain trough 336 and through collection tube 356. According to still other embodiments, controller 156 may include algorithms which avoid repeated false leaks signals, e.g., by requiring a certain threshold change in intensity or repeated triggers.

Figure 21:
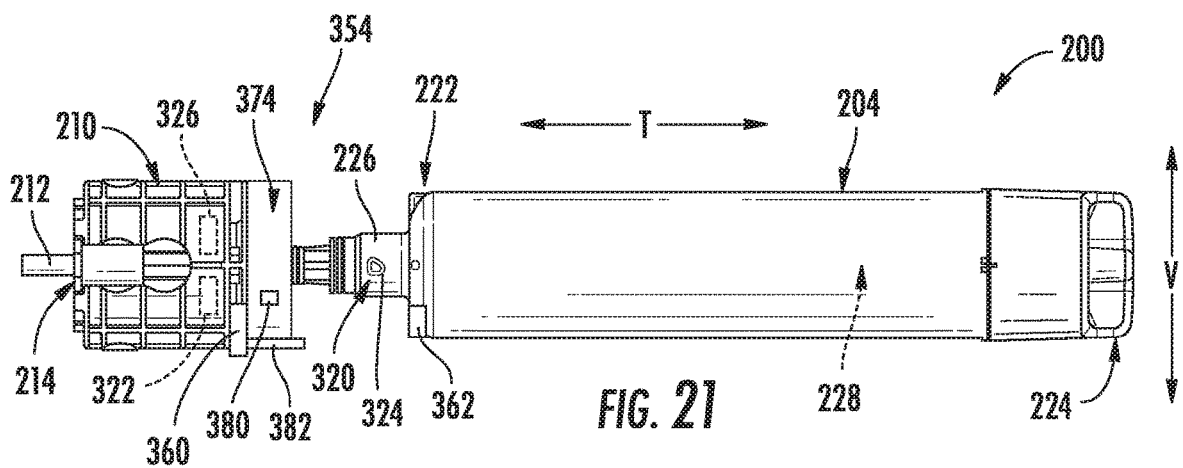
FIG. 21 provides a side view of a leak detection assembly for use with a filter assembly according to an exemplary embodiment of the present subject matter.

Referring now specifically to FIG. 21, according to alternative embodiment, bottom 358 of collection tube 356 may be capped such that leaked water 350 is collected in collection tube 356. According such an embodiment, light source 360 may be positioned above collection tube 356 along the vertical direction V while light sensor 364 may be positioned below collection tube 356. Notably, in order to prevent frequent triggers or leak indications, a heater 370 may be positioned on bottom 358 of collection tube 356 to periodically evaporate any collected water. In this manner, controller 156 may not indicate a leak the first time light intensity is changed. Instead, heater 370 may be activated to evaporate leaked water 350. Controller 156 may then trigger a leak indication only if the leaked water 350 re-collects within collection tube 356, thereby indicating an active leak exists.

Figure 22:
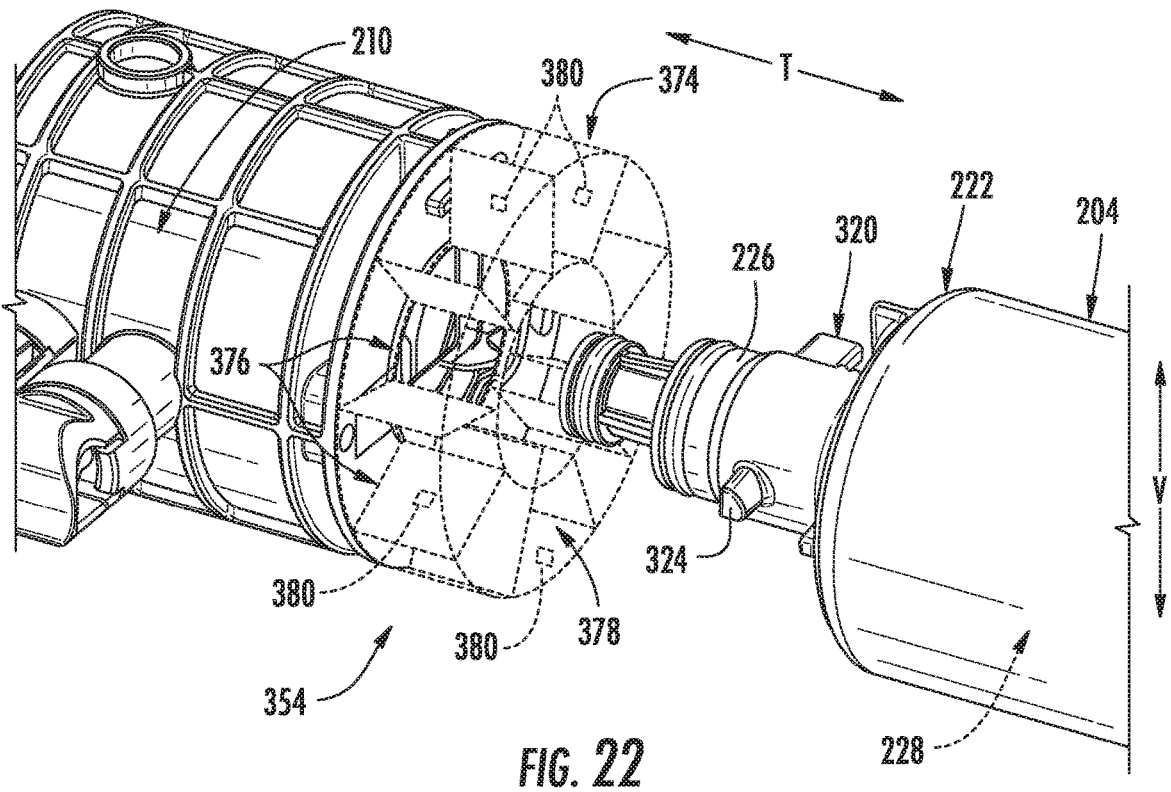
FIG. 22 provides a perspective view of the exemplary leak detection assembly of FIG. 21 according to an exemplary embodiment of the present subject matter.

Referring now to FIGS. 21 and 22, an alternative leak detection assembly 354 will be described according to an exemplary embodiment. Due to the similarity with the embodiments described above, like reference numerals will be used to refer to the same or similar parts. As illustrated, leak detection assembly 354 includes an annular reservoir 374 that is divided into a plurality of circumferentially spaced flood chambers 376. Annular reservoir 374 is positioned between filter manifold 210 and filter cartridge 204 and is rotatable. Each flood chamber 376 is open on the radially inner side such that leaked water has a tendency to flow into a bottom chamber 378 of flood chambers 376.

Light may be communicated through the bottom chamber 378 to perform leak monitoring in a manner similar to that described above. For example, according to the illustrated embodiment, the light source 360 is positioned on filter cartridge 204 such that it is positioned proximate bottom chamber 378 when installed properly. In addition, light sensor 364 is positioned on filter manifold 210 proximate bottom chamber 378. Thus, when a leak occurs and leaked water 350 falls under the force of gravity into bottom chamber 378, the light intensity change may be sensed by light sensor 364 and a leak may be indicated. After a leak is fixed, annular reservoir 374 may be rotated such that a new flood chamber 376 becomes bottom chamber 378 but does not contain any leaked water 350. According to still another embodiment, a color changing product 380 (e.g., chemiluminescent and electroluminescent polymers or other chemicals) may be positioned in the plurality of flood chambers 376 to change the color of leaked water 350 when that respective chamber 376 is flooded. In this manner, changes in light intensity may be more easily detected. Furthermore, according to the illustrated embodiment, light source 360 may be powered by an electrical contact 382 which extends from filter manifold 210 toward filter cartridge 204 along the transverse direction T. Alternatively, both light source 360 and light sensor 364 may be positioned on filter manifold 210 and a reflective tag or surface may be mounted to filter cartridge 204 to reflect light 362.

Referring again to FIGS. 12 and 13, an alternative leak detection assembly 354 will be described according to an exemplary embodiment. Due to the similarity with the embodiments described above, like reference numerals will be used to refer to the same or similar parts. As illustrated, leak detection assembly 354 includes light source 360 mounted on radially extending tag 330 (e.g., positioned in place of second contact 306 as illustrated in FIG. 12) and light sensor 364 positioned on stopping member 332 (e.g., positioned in place of first contact 304 as illustrated in FIG. 13). As such, when filter cartridge 204 is rotated until radially extending member 330 engages stopping member 332, light source 360 is positioned adjacent light sensor 364, and leak detection assembly 354 may be operated as described above.

Figure 23:
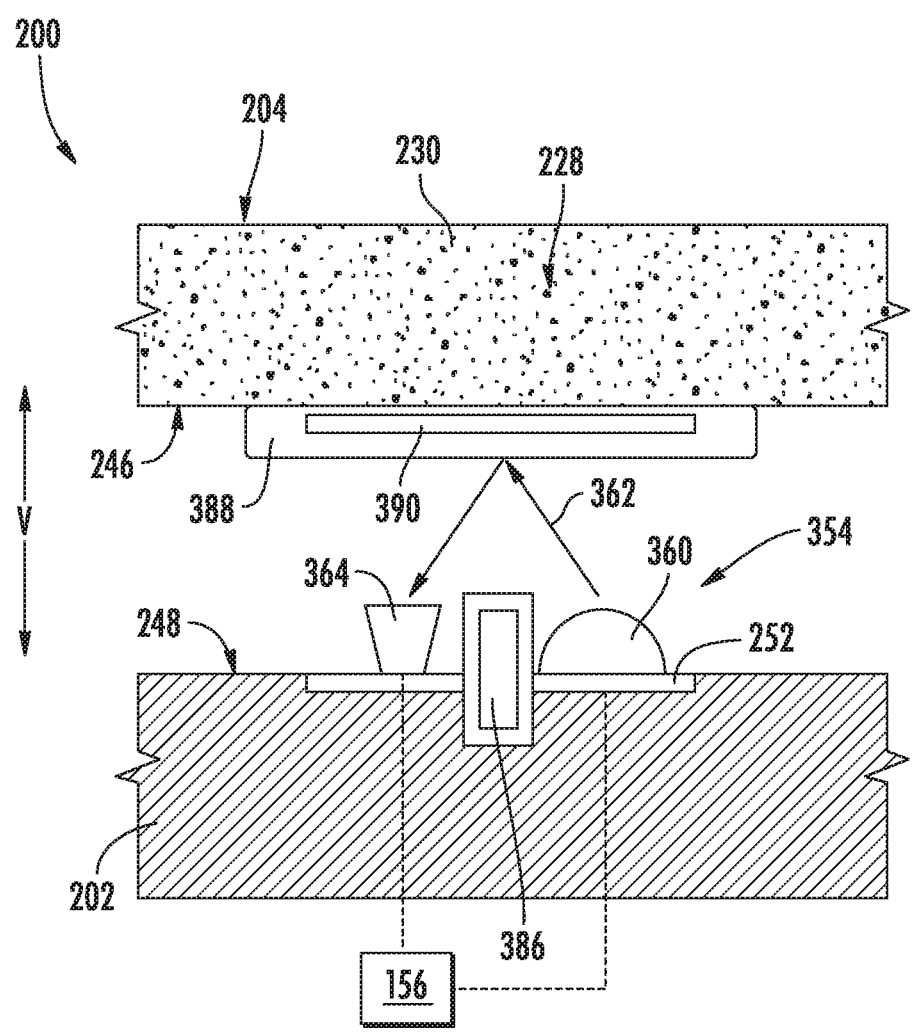
FIG. 23 provides another schematic view of a leak detection assembly for use with a filter assembly according to an exemplary embodiment of the present subject matter.

Referring now to FIG. 23, an alternative leak detection assembly 354 will be described according to an exemplary embodiment. Due to the similarity with the embodiments described above, like reference numerals will be used to refer to the same or similar parts. As illustrated, leak detection assembly 354 includes light source 360 and light sensor 364 both positioned on filter housing 202. In addition, leak detection assembly 354 includes a partition 386 positioned between light source 360 and light sensor 364 to prevent light 362 from transmitting directly from light source 360 to light sensor 364. In other words, partition 386 prevents direct line of sight transmission of light 362 to light sensor 364.

In addition, leak detection assembly 354 includes a reflective tag 388 that is positioned on filter cartridge 204 and is oriented facing light source 360 when filter cartridge 204 is properly installed. In this manner, light 362 generated from light source 360 may be reflected off reflective tag 388 and back onto light sensor 364. Thus, light sensor 364 may monitor the intensity of light 362 in the same manner as described above. Notably, light source 360 and light sensor 364 may be positioned in drain trough 336 such that leaked water 350 collects between light source 360 and reflective tag 388. In addition, leak detection assembly 354 may further include an electrical heater 390 mounted on filter cartridge 204 for heating reflective tag 388 to evaporate condensation. In this manner, the light intensity is only altered if actual leaked water 350 is present and controller 156 may detect the corresponding change in light intensity as an indication of a leak within filter assembly 200. Controller 156 may then implement corrective action as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter assembly comprising:
 a filter cartridge configured for filtering a flow of fluid and being movable between an installed position and an uninstalled position;
 a filter housing configured for receiving the filter cartridge in the installed position;
 a contact member extending from the filter housing for engaging the filter cartridge when the filter cartridge in the installed position;
 a first contact mounted to the contact member;
 a second contact mounted to the filter cartridge such that the first contact and the second contact establish an electrical connection when the filter cartridge in the installed position;
 a power supply for providing electrical power to the filter cartridge through the electrical connection;

an optical emitter mounted to the filter cartridge for transmitting a filter identification signal; and an optical receiver mounted to the filter housing for receiving the filter identification signal from the optical emitter when power is supplied through the electrical connection.

2. The filter assembly of claim 1, further comprising:
a controller operably coupled to the first contact, the controller being configured for determining that the filter cartridge is properly installed if the electrical connection is established.

3. The filter assembly of claim 2, further comprising a control valve for regulating a flow of water through a filter manifold, wherein the controller operably coupled to the control valve and is configured for:
closing the control valve if the electrical connection is not established.

4. The filter assembly of claim 1, wherein the contact member comprises:
a resilient arm that extends away from the filter housing and is urged into contact with the filter cartridge when installed.

5. The filter assembly of claim 1, wherein the contact member comprises:
a semicircular member in compression with the filter cartridge is installed.

6. The filter assembly of claim 1, wherein the contact member comprises:
a pivoting arm mounted to the filter housing and comprising a lever arm and a contact portion, the lever arm extending away from the filter housing and engaging the filter cartridge when installed to pivot the contact portion into contact with the filter cartridge.

7. The filter assembly of claim 6, wherein the contact member further comprises:
a biasing member for urging the contact portion of the pivoting arm toward the filter housing.

8. The filter assembly of claim 1, wherein the contact member is positioned proximate a bottom of the filter housing in a drain trough.

9. The filter assembly of claim 8, further comprising:
a controller operably coupled to the first contact, the controller being configured for determining that a leak exists if the electrical connection is shorted.

10. The filter assembly of claim 1, wherein the filter cartridge has an alignment feature and the housing defines a complementary feature such that the filter cartridge is properly installed when the alignment feature engages the complementary feature.

11. The filter assembly of claim 10, wherein alignment feature is a radial lug and the complementary feature is a keyed slot.

12. The filter assembly of claim 10, wherein the alignment feature is a radially extending member defined on the filter cartridge and the complementary feature comprises a stop member positioned in a drain trough, wherein the filter cartridge is rotatable until the radially extending member engages the stopping member to properly position the filter cartridge within the filter housing.

13. A refrigerator appliance comprising:
a cabinet that defines a chilled chamber for receipt of food articles for storage;
a dispensing assembly for providing a flow of water; and
a filter assembly mounted to the cabinet and operably coupled to the dispensing assembly, the filter assembly comprising:
a filter cartridge for filtering the flow of water;
a filter housing configured for receiving a filter cartridge;
a contact member extending from the filter housing for engaging the filter cartridge when the filter cartridge in an installed position;
a first contact mounted to the contact member;
a second contact mounted to the filter cartridge such that the first contact and the second contact establish an electrical connection when the filter cartridge in the installed position; and
a controller operably coupled to the first contact and being configured for determining that the filter cartridge is properly installed if the electrical connection is established;
a power supply for providing electrical power to the filter cartridge through the electrical connection;
an optical emitter mounted to the filter cartridge for transmitting a filter identification signal; and
an optical receiver mounted to the filter housing for receiving the filter identification signal from the optical emitter when power is supplied through the electrical connection.

14. The refrigerator appliance of claim 13, wherein the dispensing assembly further comprises:
a control valve for regulating the flow of water and the controller is operably coupled to the control valve and is configured for closing the control valve if the electrical connection is not established.

15. The refrigerator appliance of claim 13, wherein the contact member comprises:
a resilient arm that extends away from the filter housing and is urged into contact with the filter cartridge when installed.

16. The refrigerator appliance of claim 13, wherein the contact member comprises:
a pivoting arm mounted to the filter housing and comprising a lever arm and a contact portion, the lever arm extending away from the filter housing and engaging the filter cartridge when installed to pivot the contact portion into contact with the filter cartridge.

17. The refrigerator appliance of claim 13, wherein the contact member is positioned proximate a bottom of the filter housing in a drain trough, and wherein the controller is operably coupled to the first contact and is configured for determining that a leak exists if the electrical connection is shorted.

* * * * *